(12) United States Patent
Thomas et al.

(10) Patent No.: US 12,505,271 B2
(45) Date of Patent: Dec. 23, 2025

(54) EVENT-DRIVEN TRACING IN STATIC TIMING ANALYSIS OF DIGITAL CIRCUIT DESIGNS

(71) Applicant: Synopsys, Inc., Sunnyvale, CA (US)

(72) Inventors: Jacob Philip Thomas, San Jose, CA (US); Paul Gross, Rutland, MA (US); Norbert Heindl, Richardson, TX (US); Clayton McDonald, Ponce Inlet, FL (US)

(73) Assignee: SYNOPSYS, INC., Sunnyvale, CA (US)

( * ) Notice: Subject to any disclaimer, the term of this patent is extended or adjusted under 35 U.S.C. 154(b) by 516 days.

(21) Appl. No.: 18/073,100

(22) Filed: Dec. 1, 2022

(65) Prior Publication Data
US 2025/0190664 A1    Jun. 12, 2025

(51) Int. Cl.
*G06F 30/30*    (2020.01)
*G06F 30/3308*    (2020.01)
*G06F 30/3315*    (2020.01)
*G06F 119/12*    (2020.01)

(52) U.S. Cl.
CPC ...... *G06F 30/3315* (2020.01); *G06F 30/3308* (2020.01); *G06F 2119/12* (2020.01)

(58) Field of Classification Search
CPC ............. G06F 30/3315; G06F 30/3308; G06F 2119/12
See application file for complete search history.

(56) References Cited

U.S. PATENT DOCUMENTS

| | | | |
|---|---|---|---|
| 6,581,197 | B1 | 6/2003 | Foutz et al. |
| 6,611,948 | B1 | 8/2003 | Tyler et al. |
| 6,829,755 | B2 | 12/2004 | Gutwin et al. |
| 6,996,515 | B1 | 2/2006 | Foltin et al. |
| 7,334,203 | B2 | 2/2008 | Chan |
| 8,341,572 | B1 | 12/2012 | Tiwary et al. |

(Continued)

OTHER PUBLICATIONS

Martin et al., "Analysis and Simulation of Mixed-Technology VLSI Systems", Journal of Parallel and Distributed Computing 62, 468-493 (Year: 2002).*

(Continued)

*Primary Examiner* — Jack Chiang
*Assistant Examiner* — Brandon Bowers
(74) *Attorney, Agent, or Firm* — Womble Bond Dickinson (US) LLP

(57) ABSTRACT

A method includes: receiving a circuit design including circuit stages; deriving initial logic conditions for nets in a fanout cone from an input port in accordance with a primordial event; initializing a priority queue of logic transition events with the primordial event; determining a trigger event from the priority queue, the trigger event having a timestamp equal to or earlier than all others in the priority queue and representing a logic transition at an input pin of a current circuit stage; simulating an arc of the circuit design from the input pin of the current circuit stage to an input pin of a fanout circuit stage to generate a propagated event; computing a propagated event timestamp based on: the trigger event timestamp; and a delay associated with the arc; enqueuing the propagated event on the priority queue; and generating a static analysis report based on the propagated event timestamp.

20 Claims, 18 Drawing Sheets

(56) References Cited

U.S. PATENT DOCUMENTS

| | | | |
|---|---|---|---|
| 11,327,790 B1* | 5/2022 | Gaur | G06F 9/3804 |
| 2008/0071515 A1* | 3/2008 | Bhadra | G06F 30/3312 |
| | | | 703/16 |
| 2021/0279392 A1* | 9/2021 | Banerjee | G06F 30/3315 |

OTHER PUBLICATIONS

International Search Report and Written Opinion for International Application No. PCT/US2023/079918, dated Mar. 19, 2024, 12 pages.

* cited by examiner

EVENT-DRIVEN TRACING IN STATIC TIMING ANALYSIS OF DIGITAL CIRCUIT DESIGNS

TECHNICAL FIELD

The present disclosure relates to an electronic design automation (EDA) system. In particular, the present disclosure relates to event-driven tracing in static timing analysis of digital circuit designs.

BACKGROUND

Digital electronic circuits include multiple (e.g., tens or hundreds of millions) transistors arranged into logic gates and other circuit cells forming sub-circuits, where one or more clock signals synchronize their activities. Propagation of signals through these sub-circuits and along wires connecting the transistors within the sub-circuits and between different sub-circuits introduce timing delays (e.g., influenced by factors such as the switching parameters of individual transistors, parasitic capacitances, resistances, and inductances, crosstalk (coupling between nets or wires), and the speed of light), and different paths through a circuit may introduce different amounts of delay between an input port and an output port.

A design process for a digital electronic circuit includes timing analyses for detecting potential timing violations (or violations of timing constraints) in the circuit design between the input and output interfaces of the circuit. These timing analyses may include identifying critical timing paths between presenting data on the input interface of the circuit and having a valid output appear at the output interface of the circuit, where these critical paths include a minimum delay path (setting a lower bound on a timing delay) and a maximum delay path (setting an upper bound on the timing delay). These critical paths may, in turn, constrain the digital circuit to operate correctly only within a range of clock frequencies.

SUMMARY

Aspects of the present disclosure relate to event-driven static timing analysis of a digital circuit design. According to some aspects, the event-driven static timing analysis automatically identifies critical timing paths between an input and an output of the circuit. Some aspects further relate to event-driven or event-based static analysis to estimate power consumption along various paths through the circuit, such as identifying a path having highest power consumption. Further aspects relate to detecting glitching behavior (e.g., circuit stages within the circuit design that exhibit glitching behavior at their outputs).

According to one embodiment of the present disclosure, a method includes: receiving a digital circuit design including a plurality of circuit stages; deriving, by a processing device, initial logic conditions for a plurality of nets in a fanout cone from an input port of the digital circuit design in accordance with a primordial event at the input port; initializing a priority queue of logic transition events prioritized by corresponding timestamps with the primordial event; determining a trigger event from the priority queue, where the trigger event has a trigger event timestamp equal to or earlier than the timestamps of all other logic transition events in the priority queue, the trigger event representing a logic transition at an input pin of a current circuit stage of the plurality of circuit stages; simulating a first arc of the digital circuit design from the input pin of the current circuit stage to an input pin of a fanout circuit stage of the digital circuit design connected to an output of the current circuit stage to generate a propagated event representing a logic transition at the input pin of the fanout circuit stage; computing a propagated event timestamp of the propagated event based on: the trigger event timestamp; and a delay associated with the first arc connecting the current circuit stage to the fanout circuit stage; enqueuing, by a processing device, the propagated event on the priority queue in accordance with the propagated event timestamp; and generating a static analysis report of the digital circuit design based on the propagated event timestamp.

The method may further include: determining a second trigger event from the priority queue, the second trigger event having a second trigger event timestamp equal to or earlier than all other logic transition events in the priority queue, the second trigger event being associated with a second current circuit stage of the plurality of circuit stages; simulating a second arc of the digital circuit design from an input pin of the second current circuit stage to an input pin of a second fanout circuit stage of the digital circuit design connected to an output of the second current circuit stage to generate a second propagated event representing a logic transition at the input pin of the second fanout circuit stage; computing a second propagated event timestamp of the second propagated event based on: the second trigger event timestamp; and a delay associated with the second arc connecting the second current circuit stage to the second fanout circuit stage; and enqueuing the second propagated event on the priority queue in accordance with the second propagated event timestamp, wherein the first arc and the second arc are on different timing paths through the digital circuit design.

The method may further include: determining a second trigger event from the priority queue, the second trigger event having a second trigger event timestamp equal to or earlier than all other logic transition events in the priority queue, the second trigger event being associated with a second current circuit stage of the plurality of circuit stages; and blocking the second trigger event based on determining an infeasible sensitization based on a logic condition of a side input of the second current circuit stage.

The method may further include: determining a second trigger event from the priority queue, the second trigger event having a second trigger event timestamp equal to or earlier than all other logic transition events in the priority queue, the second trigger event being associated with a second current circuit stage of the plurality of circuit stages; simulating a second arc of the digital circuit design from an input pin of the second current circuit stage to an input pin of a second fanout circuit stage of the digital circuit design connected to an output of the second current circuit stage to generate a second propagated event representing a logic transition at the input pin of the second fanout circuit stage; determining that the second propagated event causes no change in a logic condition at the input pin of the second fanout circuit stage; and cancelling the second propagated event.

The simulating the first arc of the digital circuit design may include: searching, in a multiple input switching window around the trigger event timestamp, for other events on one or more other input pins of the current circuit stage; and in response to detecting one or more other events, applying all events in the multiple input switching window when simulating the first arc.

The method may further include: identifying a second propagated event representing a different logic transition than the logic transition of the propagated event on the input pin of the fanout circuit stage, the second propagated event having a second propagated event timestamp earlier than the propagated event timestamp; and detecting a glitch based on a function of: a difference in the propagated event timestamp and the second propagated event timestamp; and an inertial delay of the timing arc.

The method may further include: determining that the current circuit stage associated with the trigger event is a volatile circuit stage; and adding the trigger event to an overflow queue as an overflow event for processing after emptying the priority queue.

The method may further include: enqueueing one or more additional primordial events at the input port of the digital circuit design onto the priority queue, the one or more additional primordial events having timestamps later than the primordial event.

The method may further include: deriving additional initial logic conditions for a plurality of nets in one or more additional fanout cones from one or more additional input ports of the digital circuit design in accordance with an earliest primordial event of one or more primordial events at each of the one or more additional input ports; and enqueuing the one or more primordial events at each of the one or more additional input ports onto the priority queue.

According to one embodiment of the present disclosure, a system includes: a memory storing instructions; and a processor, coupled with the memory and to execute the instructions, the instructions when executed cause the processor to: receive a digital circuit design including a plurality of circuit stages of the plurality of circuit stages; derive initial logic conditions for a plurality of nets in a fanout cone at an input port of the digital circuit design in accordance with a primordial event at the input port; initialize a priority queue of logic transition events prioritized by corresponding timestamps with the primordial event; determine a trigger event from the priority queue, where the trigger event has a trigger event timestamp equal to or earlier than the timestamps of all other logic transition events in the priority queue, the trigger event representing a logic transition at an input pin of a current circuit stage; the trigger event having a highest priority value among one or more priority values of one or more events in the priority queue, the one or more priority values being computed based on corresponding timestamps of the one or more events in the priority queue; simulate a first arc of the digital circuit design from the input pin of the current circuit stage to an input pin of a fanout circuit stage connected to an output of the current circuit stage to generate a propagated event representing a logic transition at the input pin of the fanout circuit stage; a compute a propagated event timestamp of the propagated event based on: the trigger event timestamp; and a delay associated with the first arc connecting the current circuit stage to the fanout circuit stage; enqueue the propagated event on the priority queue in accordance with the propagated event timestamp; and generate a static analysis report based on the propagated event timestamp, the static analysis report including a critical timing path of the digital circuit design including the current circuit stage and the fanout circuit stage.

The memory may further store instructions that, when executed cause the processor to: determine a second trigger event from the priority queue, the second trigger event having a second trigger event timestamp equal to or earlier than all other logic transition events in the priority queue, the second trigger event being associated with a second current circuit stage of the plurality of circuit stages; and block the second trigger event based on determining an infeasible sensitization based on a logic condition of a side input of the second current circuit stage.

The memory may further store instructions that, when executed cause the processor to: determine a second trigger event from the priority queue, the second trigger event having a second trigger event timestamp equal to or earlier than all other logic transition events in the priority queue, the second trigger event being associated with a second current circuit stage of the plurality of circuit stages; simulate a second arc of the digital circuit design from an input pin of the second current circuit stage to an input pin of a second fanout circuit stage of the digital circuit design connected to an output of the second current circuit stage to generate a second propagated event representing a logic transition at the input pin of the second fanout circuit stage; and cancel the second propagated event based on determining that the second propagated event causes no change in a logic condition at the input pin of the second fanout circuit stage.

The memory may further store instructions that, when executed cause the processor to simulate the first arc of the digital circuit design by: searching, in a multiple input switching window around the trigger event timestamp, for other events on one or more other input pins of the current circuit stage; and in response to detecting one or more other events, applying all events in the multiple input switching window in the simulation of the first arc.

The memory may further stores instructions that, when executed cause the processor to: identify a second propagated event representing a different logic transition than the logic transition of the propagated event on the input pin of the fanout circuit stage, and the second propagated event having a second propagated event timestamp earlier than the propagated event timestamp; and detect a glitch based on a function of: a difference in the propagated event timestamp and the second propagated event timestamp; and an inertial delay of the timing arc.

The memory may further store instructions that, when executed cause the processor to: determine that the current circuit stage associated with the trigger event is a volatile circuit stage; and add the trigger event to an overflow queue as an overflow event for processing after emptying the priority queue.

The static analysis report may include an event tree including a parent node corresponding to the trigger event and a child node associated with the parent node corresponding to the propagated event.

According to one embodiment of the present disclosure, a non-transitory computer readable medium includes stored instructions, which when executed by a processor, cause the processor to: receive a digital circuit design including a plurality of circuit stages of the plurality of circuit stages; derive initial logic conditions for a plurality of nets in a fanout cone at an input port of the digital circuit design in accordance with a primordial event at the input port; initialize a priority queue of logic transition events prioritized by corresponding timestamps with the primordial event; determine a trigger event from the priority queue, where the trigger event has a trigger event timestamp equal to or earlier than the timestamps of all other logic transition events in the priority queue, the trigger event representing a logic transition at an input pin of a current circuit stage; the trigger event having a highest priority value among one or more priority values of one or more events in the priority queue, the one or more priority values being computed based on the corresponding timestamps of the one or more events in the priority queue; simulate a first arc of the digital circuit design from the input pin of the current circuit stage to an input pin of a fanout circuit stage connected to an output of the current circuit stage to generate a propagated event representing a logic transition at the input pin of the fanout circuit stage; compute a propagated event timestamp of the propagated event based on: the trigger event timestamp; and a delay associated with the first arc connecting the current circuit stage to the fanout circuit stage; enqueue the propagated event on the priority queue in accordance with the propagated event timestamp; and generate a static analysis report based on the propagated event timestamp, the static analysis report including a critical path of the digital circuit design including the current circuit stage and the fanout circuit stage.

The critical path of the digital circuit design may include a critical power path of the digital circuit design representing a path having highest power consumption.

The non-transitory computer readable medium may further store instructions that, when executed cause the processor to simulate the first arc of the digital circuit design by: searching, in a multiple input switching window around the trigger event timestamp, for other events on one or more other input pins of the current circuit stage; and in response to detecting one or more other events, applying all events in the multiple input switching window in the simulation of the first arc, wherein the path having highest power consumption includes the current circuit stage, and wherein a power consumption of the current circuit stage is computed based on the events in the multiple input switching window.

The non-transitory computer readable medium may further store instructions that, when executed cause the processor to: detect glitching behavior in the digital circuit design by detecting two events on a same output pin in the digital circuit design; and suppress the glitching behavior by canceling the two events on the same output pin in the digital circuit design.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1A:
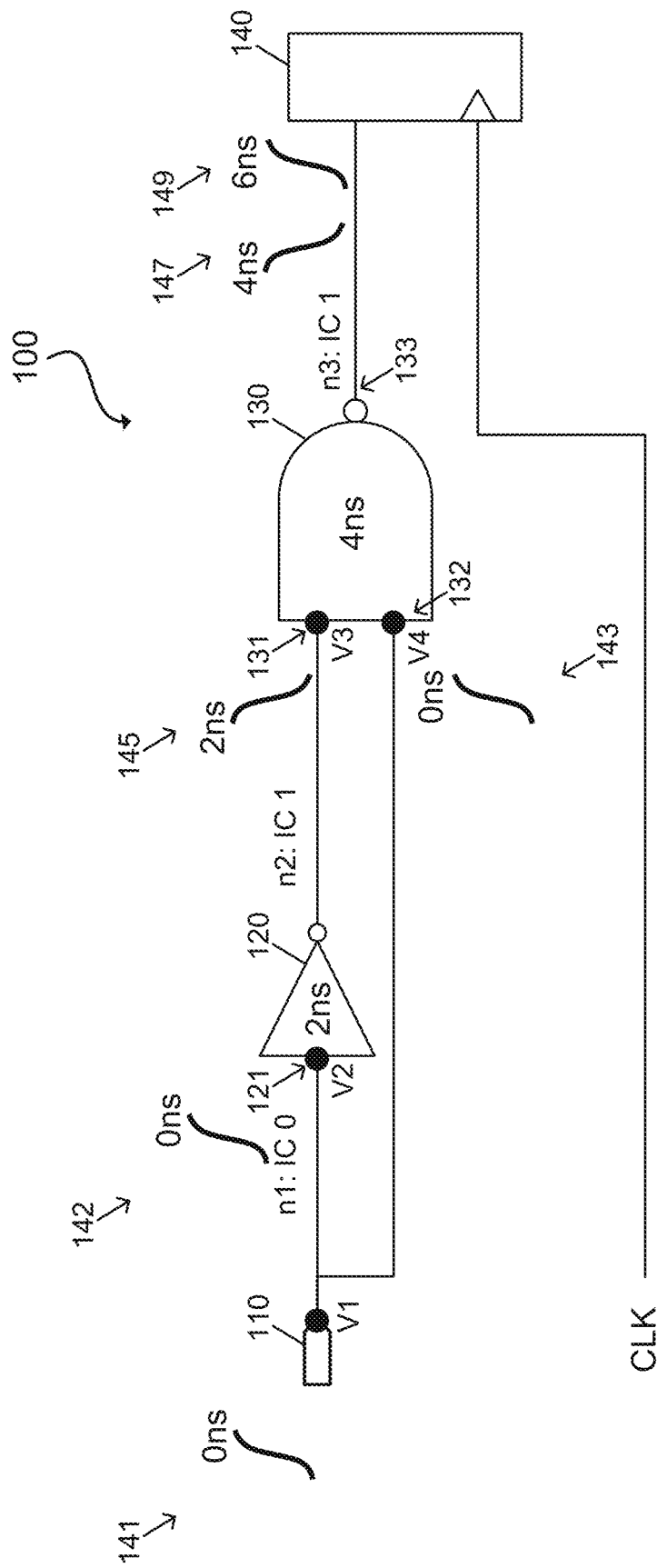
FIG. 1A is a circuit diagram illustrating a small digital circuit annotated to illustrate an embodiment of the present disclosure.

Aspects of the present disclosure relate to event-driven tracing in static timing analysis of digital circuit designs. Aspects of the present disclosure also relate to applying event-driven tracing to static power analysis of digital circuit designs.

A design process for a digital electronic circuit includes timing verification for determining a range of clock frequencies at which the design can operate without signals arriving at an undesired time (e.g., too early or too late). Incorrect arrival times of signals may cause the circuit to operate in a manner inconsistent with its specified behavior such that it produces incorrect results. For example, if the data input of a latch (a type of memory) arrives after the closing edge of the clock (a setup violation), or if the data input changes before the closing edge of the previous clock (a hold violation), the latch may not store the data correctly. Like functional violations, a hold violation cannot be fixed by adjusting the clock frequency and must be addressed in a redesign of a part of the circuit.

Timing analysis detects potential timing violations (or violations of timing constraints) in the circuit design and at the input and output interfaces. Different paths through the circuits may have different lengths, and some combinations of input signals cause those signals to take different paths through the circuit. Therefore, some sets of input signals may cause output signals to be generated too soon while other sets of input signals may cause output signals to be generated too late. In other words, there is a timing margin (e.g., a window of time between the closing edge of the previous clock signal and the closing edge of the current clock signal) of allowed variability and timing analysis may be used to detect whether the circuit will operate within that timing margin.

In addition, the clock signals themselves travel through the digital circuit along wires that introduce propagation delay, and the clock signals may also interact with sub-circuits that also change the timing of the clock signals. These timing delays and timing differences can limit the maximum clock rate of the circuit, because higher clock rates have a smaller or tighter timing margin, and therefore are less able to absorb timing differences between different paths through the circuit. Furthermore, some specific use cases of circuit may require operation at particular clock rates (e.g., higher clock rates generally provide higher computational performance while lower clock rates generally provide lower power consumption), such as in order to meet a minimum data processing bandwidth for data communications (e.g., on a serial link) or to meet a frame rate requirement for data output to a display device.

After detecting potential timing violations in the circuit design using timing analysis, an engineer can modify or redesign the circuit design to prevent these timing violations from occurring. Failure to detect and correct timing violations in a circuit design can lead to circuit designs that only work at slow clock rates or that may fail to work entirely (e.g., fail to operate at a sufficiently high clock rate to meet the design goals of the circuit).

One approach to timing analysis is dynamic simulation, where a computer system simulates the propagation of signal values through the circuit design, starting with an input vector of values and clock transitions supplied at input ports of the simulated circuit. The simulation accounts for propagation delays along the wires connecting the pins of the cells in the design and timing delays (which may be pre-characterized or determined at runtime by simulating the cells at the transistor levels) associated with the cells in the circuit design (e.g., transistor switching delays). The transitions in signal value that are propagated through the circuit design will be referred to herein as transition events or events.

However, dynamic simulation can be very time consuming due to the complexity of the digital circuit designs and because the number of possible input vectors is exponential in the number of inputs (e.g., $2^n$ possible inputs for a sub-circuit with n number of input ports) and in the number of state elements (e.g., flip-flops, latches, registers, etc.). This means that only a small portion of all possible inputs can be simulated in a reasonable amount of time and the design cannot be exhaustively checked. Furthermore, human engineers must exercise their judgment to select this small collection of input vectors to run (e.g., test cases) to try to reveal the critical paths of the design.

In contrast, static timing analysis (STA) breaks down the circuit design into timing paths and searches for timing violations along each of these timing paths. A timing path is a sequence of causal conducting stages that propagates a signal transition at a source to an ensuing signal transition at a sink. Static timing analysis does not simulate the operation of the circuit in response to a given set of input vectors and therefore does not rely on user-generated input vector of input signals.

In some implementations, a STA process analyzes a given circuit design as a graph and performs the search for timing violations (critical paths representing paths that cause a signal to arrive too early or too late) by applying graph traversal methods such as a depth-first search (DFS) or a breadth-first search (BFS) and employing a three-state (0, 1, or X) logic implication system to trace the signal transitions from the source and cascading through the conducting stages to the sink. For example, in a DFS approach, the search begins at an input port of the circuit design and propagates a transition through the circuit, tracing first along paths that lead deeper into the circuit (e.g., toward downstream circuit elements) at each branch point. Once the path has reached an end point (such as a memory element or an output port), the DFS approach steps backward to the most recent branch in the search and continues with tracing along the next unexplored path. As a result, DFS or BFS traces the timing paths in topological order as they appear in the circuit design, without regard to the timing of the transition events. This means that approaches based on DFS or BFS do not maintain temporal logic at all nets during the tracing process and are unable to avoid false paths (e.g., a path that is never sensitized due to logic configuration, expected data sequence, or operating mode). In addition, some static timing analysis techniques cannot accurately model some types of clock networks such as pulser and shaper clock circuits and self-timed clock circuits without user intervention. However, manual intervention in the form of overriding the default behavior of the modeling of the clock circuit (e.g., manually specifying false paths or manually disabling some checks) is prone to errors. As such, static timing analysis using DFS and BFS are insufficient to automate analysis of clock networks that include, for example, self-timed loops and clock shaping (enable signals at the inputs of cells to alter the output clock waveform as compared to the input clock waveform, e.g., such that the output clock waveform may be stretched or truncated). Some techniques for overcoming the shortcomings of DFS and BFS with respect to clock networks include dynamic clock simulation (DCS) in which the clock portion of the circuit is simulated together to generate accurate clock events that are used for the static analysis of the other (logic) portions of the circuit.

Therefore, aspects of embodiments of the present disclosure relate to event-driven static timing analysis which traces timing paths through a circuit design based on a time ordering of transition events.

An event-driven static timing analysis according to embodiments of the present disclosure introduces a primordial event (PE) at an input port of the design, such as a transition from logic 0 to logic 1 or vice versa. The timing of the primordial event is controlled by clock waveforms and latencies at clock and data ports defined as part of a design. The primordial event is propagated to downstream circuit elements from the input port, keeping track of the propagation delay of the wire on the way to an input pin of a cell in the circuit. Upon reaching an input pin of a current cell, a new or additional event is generated for each subsequent input pin through the current cell (e.g., each input pin of a downstream cell connected to an output of the current cell) and each new event is given a timestamp based on the time taken to arrive at that corresponding subsequent input pin. These new events are then added to a priority queue that is sorted by timestamp, with the event having earliest timestamp appearing first or at the head of the priority queue. The event-driven timing analysis proceeds by selecting a next event to process from the head of the priority queue. Therefore, events are processed based on time order, rather than the topological order in which the circuit elements are connected in the overall circuit design.

Technical advantages of an event-driven approach according to the present disclosure include but are not limited to: accurate tracking of temporal logic at switching pins and nets, compared to techniques based on DFS or BFS; accurate processing of multiple inputs switching; faster performance (e.g., shorter runtime) than comparable techniques based on DFS and DCS; exhaustive path coverage without using input vectors; tracing multiple paths through the same vertexes for a given input primordial event; improved ease of use for engineers (e.g., no need to manually perform control path tracing (e.g., manually marking false paths) and no need to specify input vectors for simulation); and the ability to perform, for example, noise analysis, power analysis, and glitch detection using an event-driven static analysis.

FIG. 1A is a circuit diagram illustrating a digital circuit annotated to illustrate an embodiment of the present disclosure. The circuit shown in FIG. 1A is chosen to illustrate various features according to the present disclosure. In practice, embodiments of the present disclosure are applicable to larger digital circuits that may include combinational circuit elements (e.g., logic gates) as well as sequential circuit elements (e.g., registers, latches, flipflops, and memories).

The example digital circuit design 100 shown in FIG. 1A includes an input port 110 connected to an inverter 120 at its input pin 121. The output of the inverter 120 is connected to a NAND (not and) gate 130 at its first input pin 131. The input port 110 is also connected to a second input pin 132 of the NAND gate 130. The NAND gate 130 generates an output 133 in response to the values at its input pins 131 and 132. The output 133 may be connected to a register 140 or other sequential circuit element controlled by a clock signal (CLK), and therefore a static timing analysis of the circuit may determine whether there are timing paths through the digital circuit design 100 that cause a timing violation (e.g., a setup violation or a hold violation) based on the timing of a clock signal CLK arriving at the register 140 or other sequential circuit element controlled by the clock signal CLK.

Figure 2:
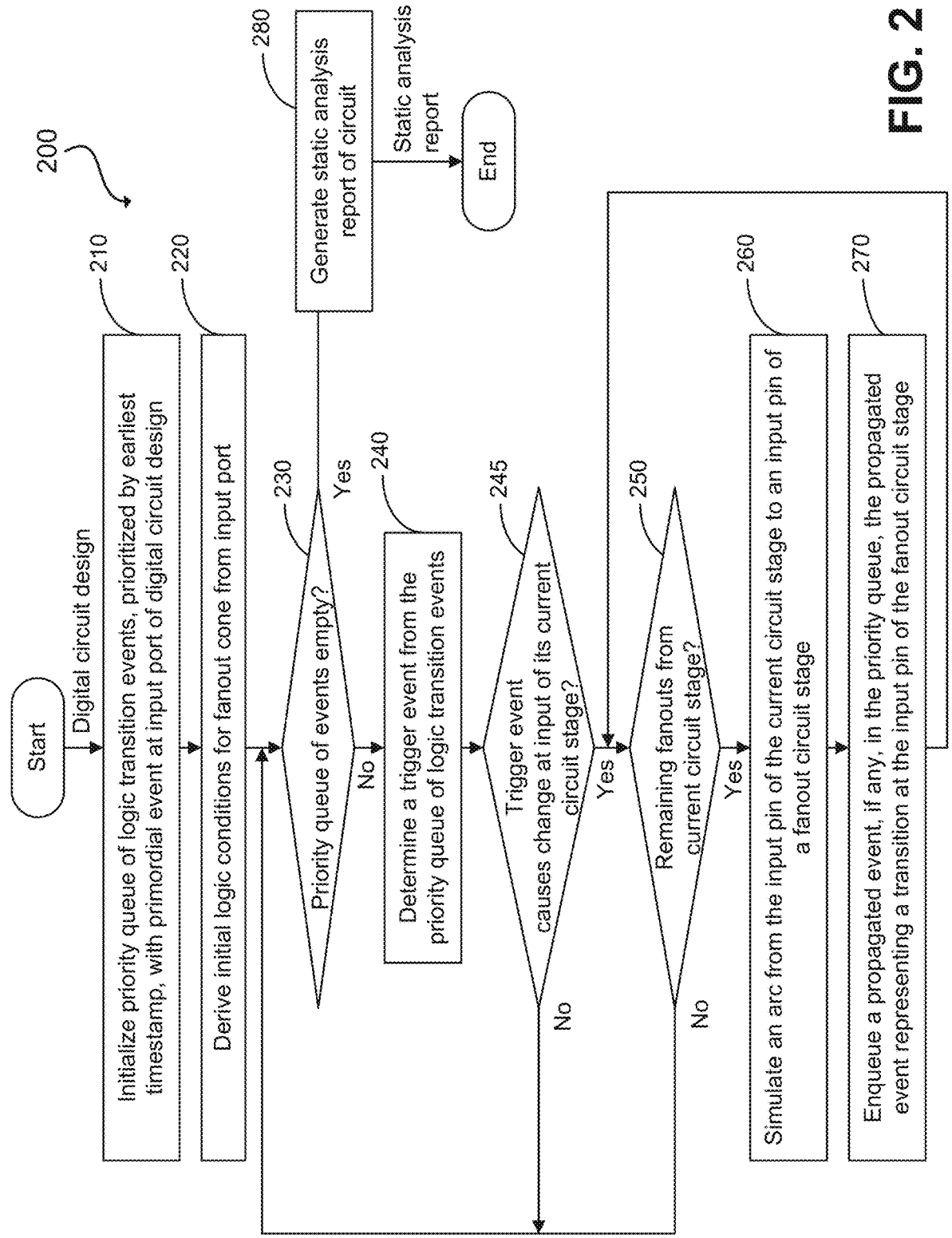
FIG. 2 is a flowchart illustrating a method according to one embodiment of the present disclosure for performing static timing analysis of a digital circuit design.

FIG. 2 is a flowchart illustrating a method 200 according to one embodiment of the present disclosure for performing static timing analysis of a digital circuit design. A digital circuit design is supplied to a software program running on a computer system (such as the computer system 1000 described below in reference to FIG. 10) and configured to perform static analysis. The computer system includes a processor and a memory, where the memory stores the software program and the processor executes instructions of the computer program, such that the software program configures the computer system to operate as a special purpose device for performing static timing analysis according to the present disclosure. In some examples, the digital circuit design is represented as a netlist (e.g., a netlist format consistent with netlist formats for use with SPICE, CDL, Verilog, etc.).

At 210, the processor of the computer system initializes a priority queue of logic transition events with a primordial event at an input port of the digital circuit design. A priority queue is a data structure in which each data element added to the priority queue has a priority or priority value associated with it. Data elements can be added or enqueued onto the priority in arbitrary order and are removed or dequeued from the priority queue based on their priority values. Implementations of priority queues may use a heap data structure but are not limited thereto and may be implemented using a linked list or an array, with different tradeoffs for different implementations.

In event-driven static timing analysis according to examples of the present disclosure, an event is a signal transition at an input of a circuit stage or at an output port. These events are associated with timestamps representing the time at which a logic transition (e.g., from logic 0 to logic 1 or from logic 1 to logic 0) occurs at a location in a digital circuit (e.g., an input pin of a circuit stage) when propagating an input transition (or primordial event) through the digital circuit.

In the example shown in FIG. 1A, a primordial event 141 has a timestamp of 0 nanoseconds (ns), which is chosen as a base timestamp for the static analysis of the digital circuit design 100. A primordial event does not necessarily have a timestamp of 0 ns and, in the case of multiple primordial events supplied at different input ports of a circuit, different primordial events may have different timestamps (e.g., 0 ns, 1 ns, 4 ns, etc.). In addition, it may be possible for events to have negative timestamps. Nevertheless, it may be convenient for the earliest event to have a timestamp of 0 ns (e.g., where the lowest timestamp is 0 ns).

In embodiments of the present disclosure, the timestamp of an event is used to compute a priority or priority value that is used to order the events in the priority queue, where earlier timestamps (e.g., smaller timestamp values) are prioritized before later timestamps. For example, the priority queue is configured such that performing a dequeue operation on the priority queue dequeues the event with the lowest or earliest timestamp among all events in the priority queue. In a case where two or more events have the same timestamp (e.g., a tie in timestamps), the priority is further determined (i.e., tiebreaking) based on, for example: the order in which the events were inserted into the priority queue; a depth of the event within the circuit (e.g., number of nodes away from the input port that was supplied with the primordial event); a random selection based on a random number generator; or the like. As used herein, when referring to an event having the highest priority in a priority queue prioritized by earliest timestamp, the highest priority event may have the same timestamp as one or more other events in the queue, where its priority value is further determined based on one or more factors in addition to timestamp. While aspects of embodiments of the present disclosure refer to the use of a priority queue to store events that are to be executed, the term is used herein to refer to the functionality in which events are added to the queue without regard to a timestamp and where the processor dequeues events from the priority queue based on a causal order (e.g., based on timestamp or time order). As noted above, a priority queue may be implemented using a variety of different underlying data structures, such as a heap, an array, a linked list, a tree, a hash table, or the like.

In the example shown in FIG. 1A, the primordial event 141 is enqueued onto an empty priority queue such that it is the only event on the priority queue.

Figure 3A:
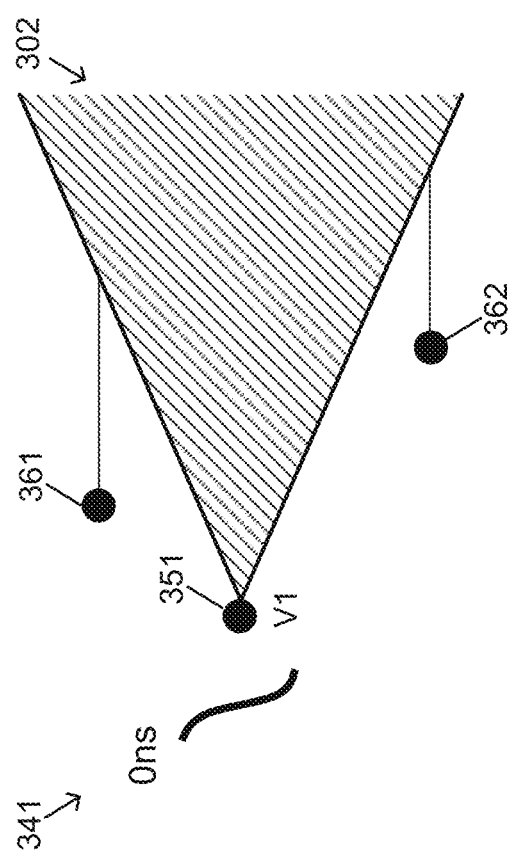
FIG. 3A illustrates a fanout cone of a representing sub-circuits within the circuit design that are downstream of a primordial event at an input port.

At 220, the processor derives initial logic conditions for a fanout cone from the input port to be consistent with the primordial event, prior to its execution. FIG. 3A illustrates a fanout cone 302 representing sub-circuits within the circuit design that are downstream of a primordial event 341 at an input port 351. The fanout cone includes nets having logic states that could be affected by the state transition associated with primordial event. For example, sub-circuits (or circuit stages) having inputs connected directly to the input port 351 would be included in the fanout cone. Likewise, sub-circuits directly connected to the outputs of those sub-circuits would also be included in the fanout cone 302. It is also possible for circuit elements within the fanout cone 302 to receive side inputs (e.g., side inputs 361 and 362) originating outside of the fanout cone 302, where the logic states of those side inputs may be controlled by other exogenous events occurring at different input ports of the circuit (the term primordial event may be used herein to refer to an exogenous event that is currently being traced from). In some embodiments, the side inputs and/or other exogenous events from outside the fanout cone are automatically set such that the values are conducive for events within the fanout cone to propagate, such that the various possible paths are explored. In some embodiments, some or all of the values of the side inputs and other exogenous events are manually set or specified by a user.

Referring to FIG. 1A, the fanout cone from the primordial event 141 at the input port 110 includes all the circuit elements shown in the example digital circuit design 100. When deriving the initial logic conditions, the net connected to the input port 110 (first net n1) is set to a logic value that gives effect to the event. Because the primordial event 141 in the example shown in FIG. 1 is a rising logic transition from logic 0 to logic 1 (or low to high), the processor sets the initial state at the first net n1 to logic 0 (indicated as IC 0) in order for the primordial event to have an effect that transitions from the initial state of logic 0 to the new state of logic 1 after executing the primordial event 141.

Because the first net connected to the input pin 121 of the inverter 120 has an initial state of logic 0, the inverter 120 outputs logic 1, and therefore second net n2 has an initial state of logic 1. Because logic 1 is supplied to the first input pin 131 of the NAND gate 130 and logic 0 is supplied to the second input pin 132 of the NAND gate 130, the output of the NAND gate is logic 1, and therefore a third net n3 has an initial state of logic 1, consistent with the operation of the circuit stages (e.g., logic gates) in the example digital circuit.

As such, the processor determines the initial state of the nets of the digital circuit design 100 to be consistent with an initial state of a net connected to the input port prior to applying the primordial event 141 at the input port 110 based on the behavior of the circuit elements in the fanout cone of the primordial event 141.

At 230, 240, 250, 260, and 270, the processor iteratively performs event propagation through the digital circuit design by tracing multiple signal timing paths concurrently. For example, multiple different timing paths may all be stored in a partial state of completion while the events along those timing paths are executed from the priority queue based on a time order. In contrast, a depth-first search (DFS) approach to searching for timing paths evaluates a single potential timing path at a time.

At 230, the processor determines whether the priority queue of events is empty. If the priority queue of events is empty, then the event propagation of the primordial event through the digital circuit design is complete and the process proceeds with analyzing the results of the event-based static analysis process at 280, as described in more detail below. If the priority queue of events is not empty (e.g., there is at least one event on the priority queue), then the processor continues at 240 by determining a trigger event from the priority queue prioritized by earliest timestamp (with tie-breaking as necessary, as discussed above). For example, in some embodiments, the determining the trigger event includes dequeuing a trigger event from the priority queue, where the determined trigger event is an event with a timestamp that is equal to or earlier than all other events in the priority queue, where ties in timestamp (e.g., equal timestamps) are automatically broken as part of the determination (e.g., through the use of randomness or based on other factors, such as a unique event identifier associated with each event).

In the example of FIG. 1A, the priority queue initially stores only the primordial event 141, and therefore that primordial event is dequeued at 240. The event that was dequeued from the priority queue and that is currently being processed is referred to as a trigger event.

In some examples of the present disclosure, the processor determines, at 245, whether the trigger event causes a change in logic value at the input pin at which it is supplied. Based on determining that the trigger event does not cause a change in logic value at its input pin (e.g., if the input pin already has a value of logic 0 and the event is a transition from logic 1 to logic 0 or if the input pin already has a value of logic 1 and the trigger event is a transition from logic 0 to logic 1), then the trigger event is discarded (because it produces no meaningful change) and the processor returns to 230 to select a next event from the priority queue as a next trigger event.

At 250, based on determining that the trigger event does cause a change in logic value at the input pin, the processor iterates through the fanouts from the current circuit stage corresponding to the trigger event. In the example shown in FIG. 1, the primordial event 141 is connected to a current circuit stage that includes only the first net n1, which has two fanouts-one fanout to the input pin 121 of the inverter 120 and one fanout to the first input pin 131 of the NAND gate 130.

At 260, the processor simulates an arc from an input pin of the current circuit stage to an input pin of a fanout circuit stage among the remaining fanouts from the current circuit stage. For example, the processor may first simulate an arc from the input port 110 to the input pin 121 of the inverter 120. Because this arc only contains a wire, the same logic transition event is propagated directly to the input pin 121 of the inverter 120 (e.g., without performing logical operations on the transition direction). Likewise, if the processor first simulated an arc from the input port 110 to the second input pin 132 of the NAND gate 130, then the same logic transition event as the primordial event 141 would be propagated to the second input pin 132 of the NAND gate 130. In some examples of the present disclosure, the simulation of the arc of the current circuit stage is performed using a fast-SPICE (Simulation Program with Integrated Circuit Emphasis) simulator.

In the simplified example of FIG. 1, there are no timing delays caused by wires, such as the wire connecting the input port 110 to the input pin 121 of the inverter 120 and the wire connecting the input port 110 to the second input pin 132 of the NAND gate 130. However, the disclosure is not limited thereto and also includes embodiments where the wires (or interconnect) are modeled as causing timing delays, in which case the timestamps of the events arriving at the input ports are increased (e.g., shifted to a later time) based on the timing delay caused by the wires. For example, wires cause timing delays based on factors such as resistance (R), inductance (L), and capacitance (C), which may depend on the length and cross-sectional area of the wires, the material composition of the wires, and potential inter-wire coupling (e.g., cross-talk).

At 270, the processor enqueues a propagated event, if any, that was generated based on the execution of the trigger event and the associated simulation at 260, where the propagated event is a transition at an input pin of a fanout circuit stage. In the example shown in FIG. 1A, the input pin 121 of the inverter 120 is one input pin of a first fanout circuit stage and the second input pin 132 of the NAND gate 130 is one input pin of a second fanout circuit stage. At 270, the processor enqueues a logic transition event corresponding to this transition.

The processor then returns to operation 250 to repeat simulating arcs at 260 and enqueueing any propagated events at 270 until all of the fanouts from the current circuit stage have been analyzed, at which point the processor returns to 230 to determine if the priority queue of events is empty and, if not, proceed with dequeuing a trigger event from the priority queue.

In this simplified example, because it is assumed that there is zero delay along the wires and therefore a first propagated event 142 on the input pin 121 of the inverter 120 and a second propagated event 143 on the second input pin 132 of the NAND gate 130 both have a timestamp of 0 ns, like the primordial event 141. In this case, the first propagated event 142 and the second propagated event 143 are enqueued onto the priority queue in accordance with their timestamps, which are the same (0 ns) such that they would be dequeued in accordance with a tiebreaker (e.g., order in which they were enqueued or depth in circuit, etc.). However, the present disclosure is not limited thereto. For example, the wires may be modeled as introducing propagation delay such that the first propagated event 142 on the input pin 121 of the inverter 120 has a timestamp of 0.25 ns and the second propagated event 143 on the second input pin 132 of the NAND gate 130 has a timestamp of 0.75 ns. In this case, the first propagated event 142 and the second propagated event 143 are enqueued onto the priority queue in accordance with their priority values (e.g., where the priority value for an event is computed based on its timestamp, and where ties between events having equal timestamps may be broken based on other factors), e.g., such that the first propagated event 142 having a timestamp of 0.25 ns is dequeued before the second propagated event 143 having a timestamp of 0.75 ns. While events are dequeued from the priority queue in causal order (e.g., based on timestamps), the propagated events are not necessarily added to the priority queue in time order, but instead based on the order in which those propagated events are generated when executing their corresponding trigger events.

Continuing with operation 230, with the first propagated event 142 and the second propagated event 143 on the priority queue, and supposing that the first propagated event 142 is dequeued at 240. The first propagated event 142 is applied (as a trigger) at the input pin 121 of the inverter 120, and the inverter has only one fanout, which connects to the first input pin 131 of the NAND gate 130. Therefore, the arc to be simulated at 260 passes through the inverter 120 and the wire connecting the output pin of the inverter 120 to the first input pin 131 of the NAND gate 130.

In some embodiments, an event is attached to a pin of a cell, where the pin is attached to a net. The execution of the event first changes the logic value of the pin, where that logic value is then transferred to the net. As an event is simulated or executed, the current logic at its corresponding affected pin is updated based on the transition associated with that event, which then causes the net connected to the pin to be updated. In this way, the present disclosure tracks current logic for all nets in fanout cone from starting port (or starting ports). Because the events are processed in accordance with time ordering, the net logic can be kept consistent with all logic constants. In contrast, when processing the net logic in accordance with a depth first search (DFS) or breadth first search (BFS), the events may be processed out of temporal order, such that the logic values at various nets may be inconsistent with the expected actual behavior of the digital circuit design. In this example, executing the first propagated event 142 corresponding to a transition from logic 0 to logic 1 (logic low to logic high) at the input pin 121 of the inverter 120, which causes the output of the inverter to transition from logic high to logic low (or logic 1 to logic 0).

In a corresponding manner, through the simulation of the arc, the processor generates a third propagated event 145 at the first input pin 131 of the NAND gate 130. When the third propagated event 145 is executed, the logic state of the second net n2 is updated to logic 0 (or logic low) because the third propagated event 145 is a falling transition event (logic 1→logic 0). In the example shown in FIG. 1, the inverter 120 introduces a delay of 2 ns, and therefore the third propagated event 145 has a timestamp computed based on the timestamp of its parent event (the first propagated event 142 supplied at the input pin 121 of the inverter 120) and the delay along the simulated arc—here, assumed to be only the 2 ns of delay caused by the inverter, with the simplification that the wire causes no additional delay—such that the third propagated event 145 has a timestamp of 2 ns. This third propagated event 145 is enqueued on the priority queue at 270. In addition, in some embodiments, the executed trigger event is added to an event history that stores the executed events, where the event history may also be implemented as priority queue (e.g., a history priority queue), a first-in-first-out (FIFO) queue, or other data structure. Because there are no additional fanouts from the inverter 120 to process, the processor loops back to 230.

At 230, the processor determines that the priority queue is not empty because it includes the second propagated event 143 and the third propagated event 145, in that order. Therefore, during this loop, the second propagated event 143 is dequeued from the priority queue as the trigger event. At 250, the processor determines that there is a single fanout from the current stage to an input pin of the register 140. At 260, the processor simulates an arc of the circuit design from the second input pin 132 of the NAND gate 130 to the input pin of the register 140.

When simulating the second propagated event 143 having timestamp 0 ns, the second net n2 still has a value of logic 1. Therefore, transitioning the logic level at the second input pin 132 of the NAND gate 130 causes the NAND gate 130 to output logic 0. Accordingly, at 270 the processor enqueues a fourth propagated event 147 at the input pin of the register 140 representing a transition from logic 1 to logic 0 (1→0). The fourth propagated event 147 has a timestamp that is calculated based on the delay introduced by the arc through the circuit to the next input pin—in other words, through the circuit stage and the wire or interconnect that connects the output pin of the circuit stage to the input pin of the downstream circuit stage. In this case, this includes the delay introduced by the NAND gate 130 and the wire (e.g., the third net n3). As noted above, the wire delay may be modeled based on, for example, the resistance, capacitance, and inductance characteristics of the wire. The delay introduced by the circuit stage or cell may be loaded from a pre-characterized model of the cell (e.g., from a library of standard cells), where the delay is looked up based on the logic conditions of the cell (e.g., the inputs to the cell and the operating voltage and other parameters such as process dimensions) or may be computed in a transistor level simulation of the circuit stage based on factors including a slew rate of the circuit stage, an input and output capacitance of the circuit stage, sizes of the transistors, and the like, where some of these factors are intrinsic to the design of the cell (e.g., transistor level parameters of the cell) and other factors may be based on the layout of the circuit (e.g., the connections between the cell and the interconnect). The NAND gate 130 is assumed to introduce a 4 ns delay and therefore the fourth propagated event 147 has a timestamp of 4 ns.

At this point, the processor determines at 230 that the priority queue is not empty because it includes two transition events: the third propagated event 145 at timestamp 2 ns and the fourth propagated event at timestamp 4 ns and, at 240, the processor dequeues the third propagated event 145 with timestamp 2 ns, where the third propagated event 145 is at the first input pin 131 of the NAND gate 130. Executing the third propagated event 145 causes the second net n2 to be updated to logic 0, such that the inputs to the NAND gate 130 are now logic 0 (at the first input pin 131) and logic 1 (at the second input pin 132). This changes the output of the NAND gate 130 from logic 0 to logic 1, thereby resulting in a fifth propagated event 149 to be generated at the input pin of the register 140. Because the triggering event for the fifth propagated event 149 was the third propagated event 145 having a timestamp of 2 ns and because the NAND gate 130 is assumed to have a delay of 4 ns, the timestamp on the fifth propagated event 149 is 6 ns (2 ns+4 ns).

At this point in the event driven static analysis of the circuit shown in FIG. 1A, the priority queue holds two events, both of which are at the input pin of the register 140. These events are the fourth propagated event 147 at 4 ns and the fifth propagated event 149 at 6 ns. These events are executed in causal order (e.g., starting with earliest timestamp), in a manner like that described above for the other events propagated through the circuit design 100. Briefly, where executing these events includes simulating the arc from the output pin of the NAND gate 130 to the register 140, including setting the logic value at the third net n3 to the appropriate value (e.g., where the fourth propagated event 147 sets the third net n3 to logic 0 and the fifth propagated event 149 sets the third net n3 to logic 1.

Continuing with the example of FIG. 1A, after executing the fourth propagated event 147 and the fifth propagated event 149, the processor returns to 230 to check whether the priority queue is empty. When the processor detects that the priority queue is empty, at 280 the processor analyzes the causality of events to generate a static analysis report of the circuit, where the analysis may include longest and shortest path reports, detecting a timing violation in the digital circuit design based on timestamps of events (e.g., in the example of FIG. 1A, comparing the timestamps of the fourth propagated event 147 and the fifth propagated event 149 to the timestamps of clock events or based on a clock signal CLK supplied to the clock input pin of the register 140), presenting critical timing paths of the circuit, generating a tree of event dependencies, generating a report on power consumption, generating a report of static noise analysis, and generating representations of switching waveforms at points in the design based on the traced timing paths of the circuit (where the switching waveforms can be displayed graphically for user review). In more detail, static noise analysis involves the use of timing windows of aggressor nets to align them to produce the worst impact on a victim net. Approaches according to the present disclosure provide more accurate timing windows that are free of false path issues. For example, power analysis involves the use of switching activity to determine how frequently logic values transition on a net, and aspects of the present disclosure provide more accurate switching activity. Therefore, noise and power analysis can be combined into a timing analysis aspect of the present disclosure.

The generated report can be displayed to an engineer on a display device connected to the processor or transmitting the report over a computer network.

Figure 1B:
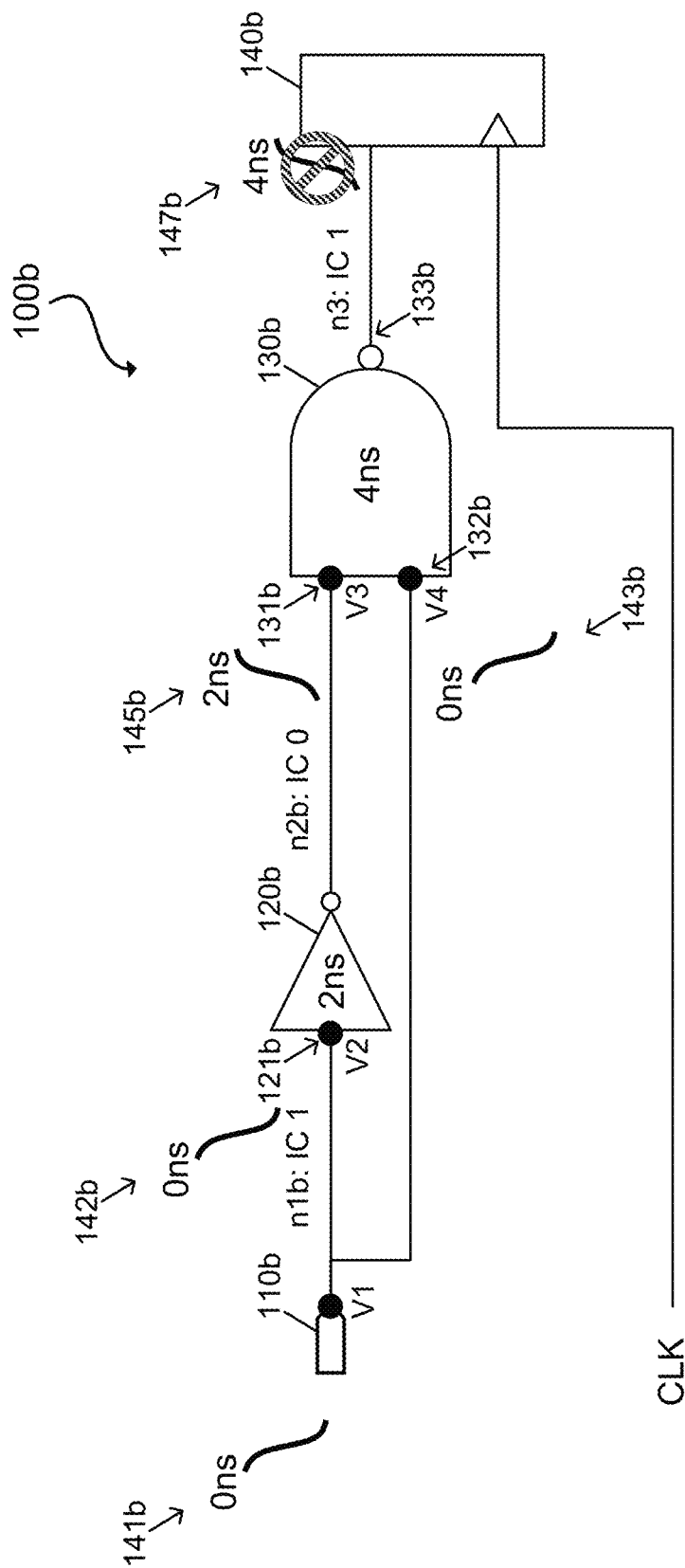
FIG. 1B is a circuit diagram illustrating a small digital circuit annotated to illustrate an embodiment of the present disclosure detecting a false path.

Some aspects of the present disclosure relate to canceling the propagation of events that cause no change in a logic value, in which case no propagated event is generated at 260 to be enqueued at 270. FIG. 1B is a circuit diagram illustrating a small digital circuit annotated to illustrate an embodiment of the present disclosure detecting a false path. FIG. 1B shows the same digital circuit design 100b as the digital circuit design 100 shown in FIG. 1A. The initial difference between FIG. 1A and FIG. 1B is that the primordial event 141b supplied to the input port 110b in FIG. 1B is a falling transition, whereas the primordial event 141 supplied to the input port 110 in FIG. 1A is a rising transition. This difference in the primordial event means that the initial state of the first net n1b is set to logic 1, which also means that the initial state of the second net n2b is set to logic 0, due to the inverter 120b having an input pin 121b connected to the first net n1b and an output pin connected to the second net n2b. However, because the initial value on the first input pin 131b of the NAND gate 130b is logic 0 and the initial value on the second input pin 132b of the NAND gate 130b is logic 1, the NAND gate 130b has an output 133b set to of logic 1, the third net n3b is initialized to logic 1 (like the initial state of the third net n3 in FIG. 1A), which is the initial value supplied to the input pin of the register 140b.

When propagating the primordial event 141b through the circuit design 100b, a first propagated event 142b is generated on the input pin 121b of the inverter 120b and a second propagated event 143b is generated on the second input pin 132b of the NAND gate 130b, in a manner similar to that described above with respect to FIG. 1A. Likewise, executing the first propagated event 142b simulates an arc through the inverter 120b and generates a third propagated event 145b having a timestamp of 2 ns at the first input pin 131b of the NAND gate 130b.

However, in contrast to the example shown in FIG. 1A, when simulating the arc between the second input pin 132b of the NAND gate 130b and the input pin of the register 140b, the processor may determine that, given that the logic value at the first input pin 131b is logic 0 at the current time (based on the timestamp of the trigger event which, at this iteration, is second propagated event 143b which has a timestamp of 0 ns), then the transition from logic 1 to logic 0 at the second input pin 132b of the NAND gate 130b means that the output 133b of the NAND gate 130b should be logic 1 (because both inputs to the NAND gate 130b have the value logic 0). However, the third net n3b already has a value of logic 1, and therefore a fourth propagated event 147b from logic 0 to logic 1 (or low to high) would cause no change. When determining that the propagated event causes no change, in some examples of the present disclosure, the propagation of that event through the cell is blocked (e.g., the propagation of the second propagated event 143 at the second input pin 132 of the NAND gate 130 is blocked by the logic 0 value at the first input pin 131 of the NAND gate 130 at time 0 ns such that the fourth propagated event 147 is not generated), such that the simulation does not generate this propagated event and therefore does not add such a propagated event 147b to the priority queue at 270.

In some circumstances, when the propagated event generated by simulating an arc is supplied as input to a sequential circuit element (e.g., register 140b) or supplied to an output port, then, in some examples of the present disclosure, the propagated event is not added to the priority queue e.g., because there are no further downstream circuit elements to propagate the event to for the purpose of detecting timing violations in the supplied portion of the circuit design.

Continuing the example, because there was only one fanout to consider for the second propagated event 143b, the processor returns to 230, determines that the queue is not empty, and dequeues the next (and only remaining) event, which is the third propagated event 145b. The third propagated event 145b has a timestamp of 2 ns and therefore the current time of the propagation is advanced to 2 ns. In the example of FIG. 1, the second propagated event 143b previously sensitized the second input pin 132b of the NAND gate 130b to logic 0. Therefore, there is no possible event at the first input pin 131b that could change the output of the NAND gate 130b from its current state of logic 1 to logic 0 (because both inputs would need to be logic 1 for the output of the NAND gate 130 to be logic 0). Therefore, at 260 the processor determines that the third propagated event 145b is blocked due to infeasible side input logic and the processor does not generate a propagated event to be enqueued at 270. Here, a processor may determine infeasible side input logic by trying to logically sensitize the circuit stage to propagate an input transition to an expected output transition. The processor is free to set those side inputs that do not have any known logic to any conducive logic (e.g., may search for a set of logic values of the side inputs to sensitize the circuit such that the input transition generates the expected output transition, where the search may be a brute force search or may be performed using, for example, a satisfiability solver or SAT solver). Only those inputs that have known logic from the event simulation are constrained to take on only their known logic values. If a valid sensitization for the non-trigger inputs cannot be selected (e.g., there is no valid sensitization for those non-trigger inputs or side inputs), then the trigger event (e.g., the transition at an input port of the circuit stage) is deemed to be blocked.

Because events that do not cause changes in input logic levels are canceled at the time of event execution, and by blocking events that encounter infeasible side input logic, false propagation paths through the circuit can be avoided and static analysis time can be reduced, because these events, which do not contribute to the determination of potential timing violations, are not processed in the course of the event driven static timing analysis.

While FIG. 2 presents the case of a single primordial event added to the queue at 210, the present disclosure is not limited thereto. In some examples of the present disclosure, multiple primordial events are added to the priority queue, where these different primordial events may correspond to logic level transitions occurring at different input ports of a digital circuit or on the same port of the digital circuit. In the case of multiple primordial events on the same port of the digital circuit, these may include a sequence of three events (e.g., 0→1, 1→0, then 0→1 or 1→0, 0→1, then 1→0), as will be described in more detail below with respect to FIGS. 7A, 7B, and 7C (where, at 220, the initial logic conditions are set based on the earliest primordial event, in other words, the primordial event having the earliest timestamp). In the case of multiple primordial events on different input ports of the digital circuit, these multiple primordial events may have the same timestamp or may have different timestamps and are dequeued from the priority queue according to those timestamps, as will be described in more detail below with respect to FIG. 8. Likewise, at 220, the processor determines the initial logic conditions for the fanout cones from all of the input ports that are supplied with corresponding primordial events. (In some embodiments, there is only one primordial event, such that all initial logic is with respect to this one primordial event. In other embodiment, there are multiple primordial events on multiple input ports, such that the initial logic is determined with respect to the earliest primordial event among the one or more primordial events at each input port.) The remaining operations of the method 200 shown in FIG. 2 can proceed as described above, despite the presence of multiple primordial events, which are scheduled for execution on the priority queue like other events.

Figure 3B:
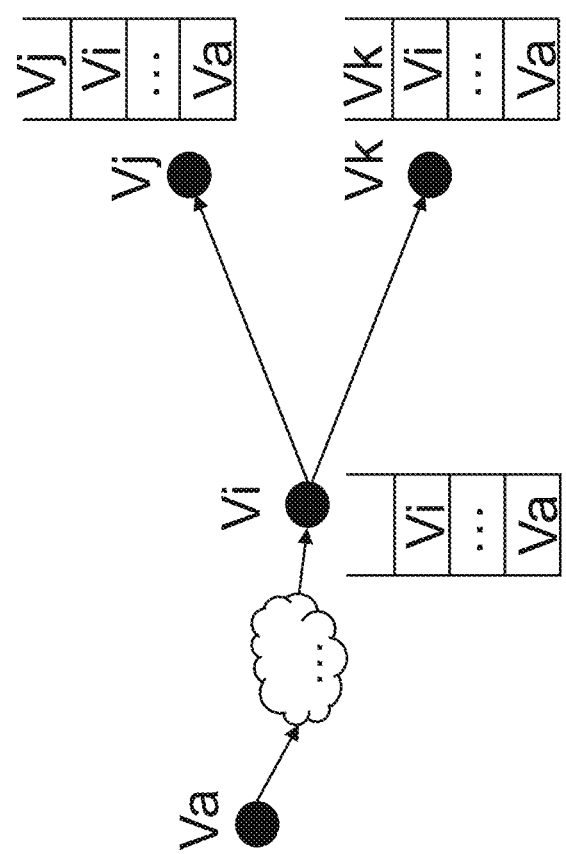
FIG. 3B illustrates a portion of a digital circuit design as a graph, where input pins of circuit stages and/or input and output ports are represented as vertexes in the graph and arcs through circuit stages are represented as edges connecting the nodes, along with data structures tracking the causality of events at each vertex.

Some aspects of the present disclosure relate to methods for tracking causality of events generated and executed through the propagation of events through a circuit design in accordance with an event-driven static timing analysis. FIG. 3B illustrates a portion of a digital circuit design as a graph, where every input pin of every circuit stage and the input and output ports are represented as vertexes in the graph and where arcs through circuit stages (e.g., including the gate and the connecting wires) are represented as edges connecting the vertexes, along with data structures tracking the causality of events at each vertex. The example shown in FIG. 3B includes a vertex Vi having two fanouts to a first fanout vertex Vj and a second fanout vertex Vk.

To illustrate the relationship between a graph representation such as that shown in FIG. 3B and a circuit diagram such as that shown in FIG. 1, various portions of FIG. 1 are annotated with vertex labels—the input port 110 is labeled V1, the input pin 121 to the inverter 120 is labeled V2, the first input pin 131 of the NAND gate 130 is labeled V3, and the second input pin 132 of the NAND gate 130 is labeled V4.

In the example shown in FIG. 3B, the vertex Vi is associated with a stack that includes all of the vertices through which events were propagated, starting with a primordial event on an input port, labeled with the vertex label Va. There may have been many other circuit stages located between vertex Va and vertex Vi, as shown by the cloud in figure and the ellipses in the stack (shown as the stack [Va, . . . , Vi]). When simulating the arc along each fanout at 260 of FIG. 2, if the downstream input pin or downstream port is reachable (e.g., as shown as first fanout vertex Vj and second fanout vertex Vk), then the stack at the current node is cloned [Va, . . . , Vi] and the fanout vertex is pushed onto the top of the stack. Accordingly, first fanout vertex Vj is associated with the stack [Va, . . . , Vi, Vj] and second fanout vertex Vk is associated with the stack [Va, . . . , Vi, Vk]. Each event pushed on the stack includes a back-pointer to their causal event (e.g., the immediately upstream event that led to the creation of that event). Therefore, the stack at each vertex tracks the causality of events and vertices that fed into that vertex. This allows generating paths in terms of the pins and nets of a circuit design. As noted above, if an event does not cause a logic change, then it is skipped over, and the corresponding vertex is not pushed onto the stack.

Figure 4A:
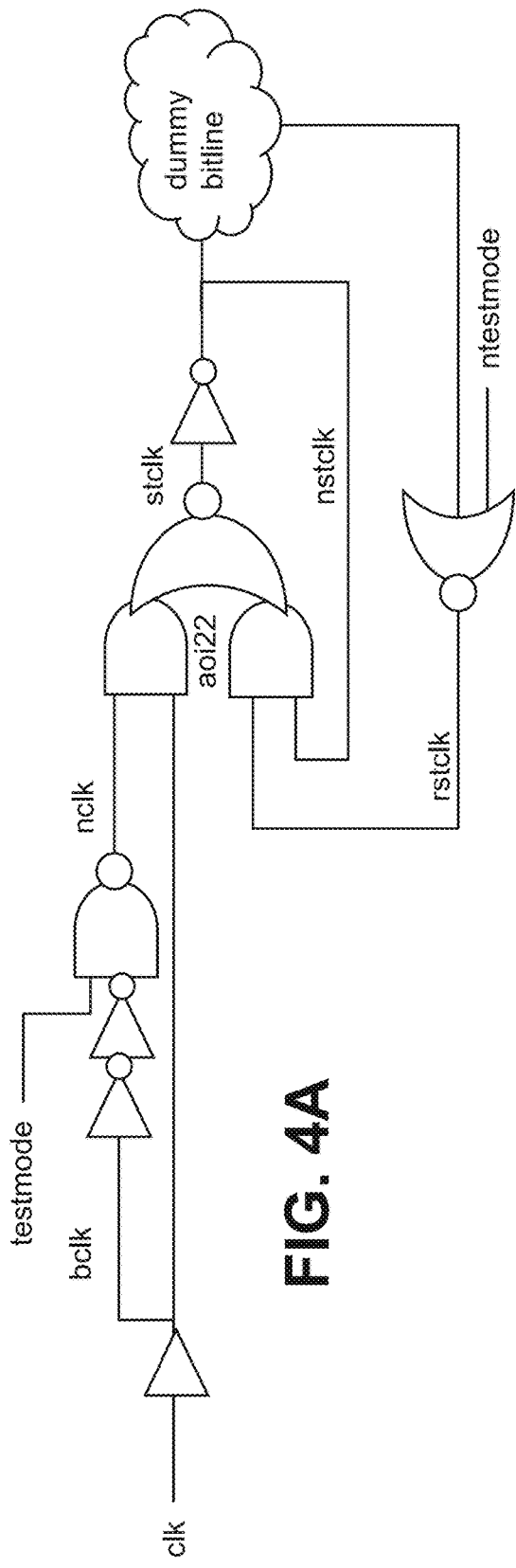
FIG. 4A illustrates an example of a self-timed clock circuit.

FIG. 4A illustrates an example of a self-timed clock circuit. As noted above, some static timing analysis tools based on DFS are unable to accurately model some types of clock networks such as self-timed clock circuits.

Figure 4B:
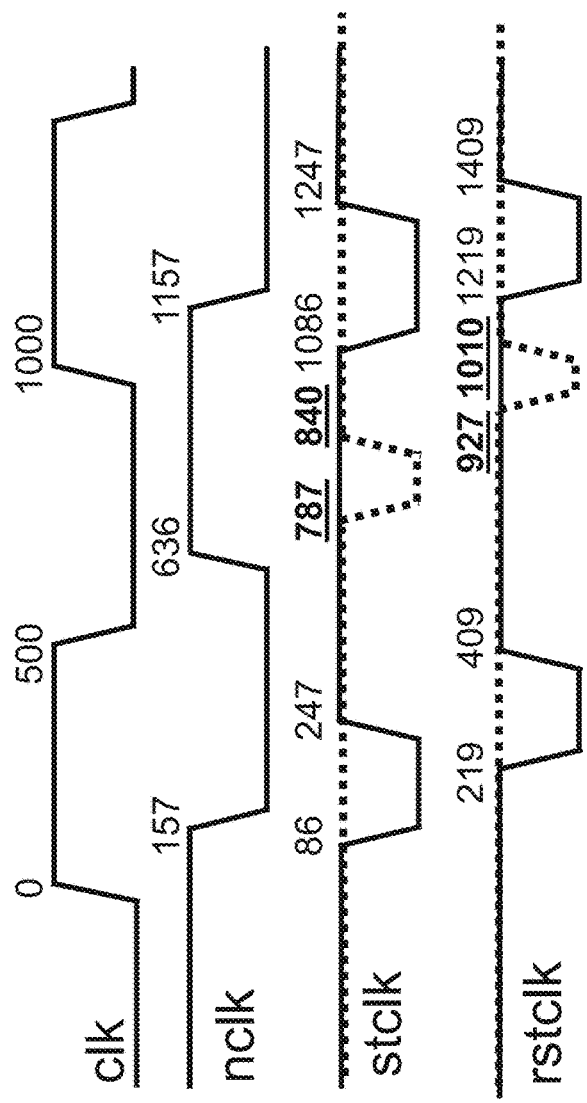
FIG. 4B illustrates signal waveform diagrams for signals in the circuit shown in FIG. 4A generated based on static timing analysis based on a depth-first search and event-based static timing analysis according to an embodiment of the present disclosure.

FIG. 4B illustrates signal waveform diagrams for signals in the circuit shown in FIG. 4A generated based on static timing analysis using a depth-first search and event-based static timing analysis, according to an embodiment of the present disclosure. The numbers located at the transitions represent the timestamps of transition events. The dotted lines in the waveforms for signals stclk and rstclk represent the incorrect waveforms generated by a depth-first search approach to static timing analysis, where the corresponding timestamps are shown in bold and underlined. The desired waveforms for stclk and rstclk, as generated by event-based static timing analysis according to an embodiment of the present disclosure, are shown in solid lines. Accordingly, as shown in FIG. 4B, methods according to the present disclosure produce more accurate results than other static timing analysis techniques.

Figure 5A:
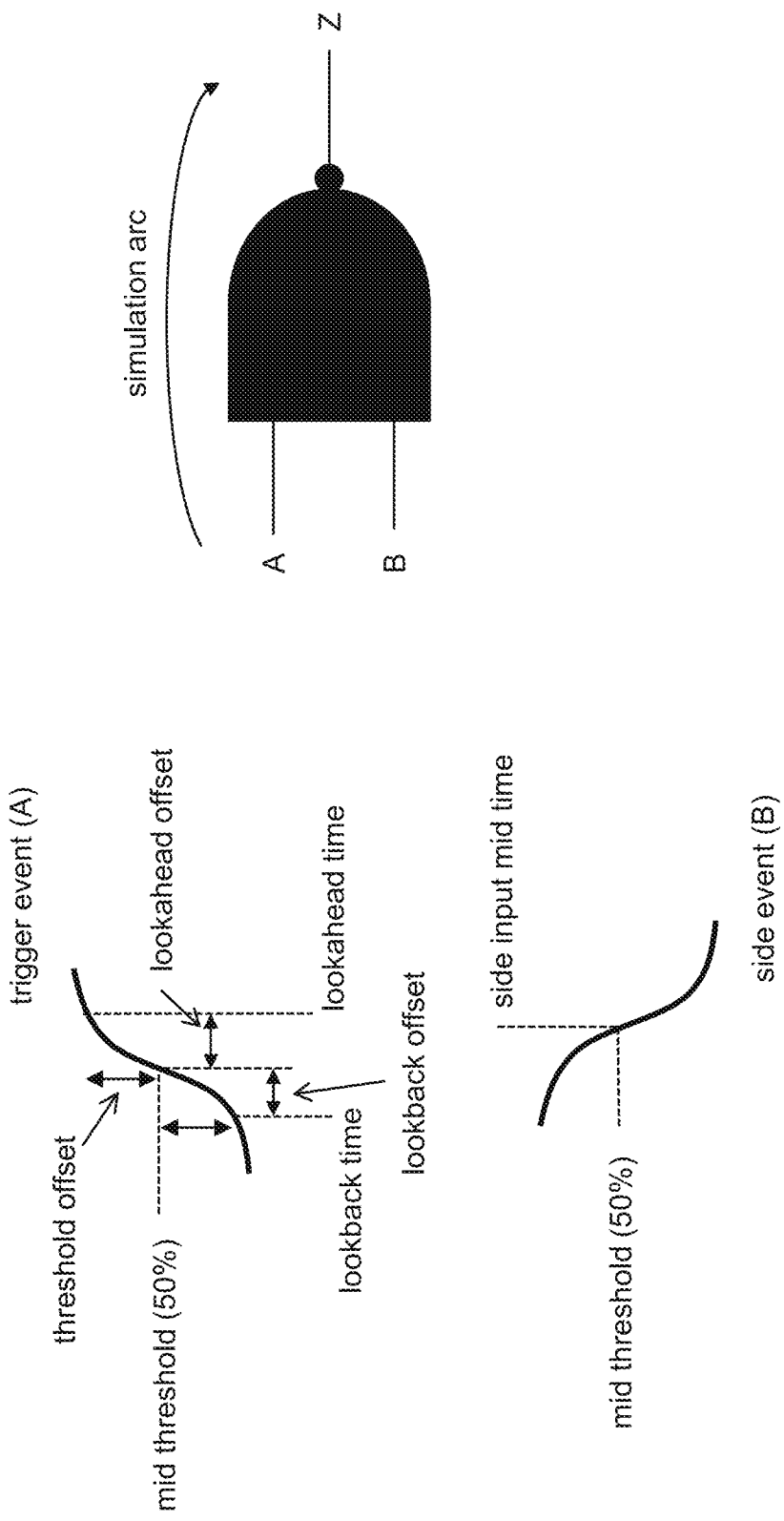
FIG. 5A illustrates multiple inputs switching on a NAND gate.

Another aspect of the present disclosure relates to constructing simulation stages with multiple inputs switching. Some logic gates, such as the NAND gate 130 shown in FIG. 1, have multiple inputs, and it is possible for multiple inputs to switch or transition during a given clock cycle. FIG. 5A illustrates multiple inputs switching on a NAND gate.

For example, inputs A and B to a NAND gate have corresponding events that switch them from logic 0 to logic 1 (0→1) and from logic 1 to logic 0 (1→0), respectively. If the 0→1 event on input A arrived first, such that both inputs were high, then the output z of the NAND gate would switch from logic 1 to logic 0. If input A and input B arrived at nearly the same time, then it would be difficult to determine whether there would be an output change, depending on the implementation details of the cell and how the input waveforms corresponding to the events overlap.

In addition, when inputs other than the trigger of a simulation unit switch close in time to the trigger it can affect the delay from the trigger. Some aspects of the present disclosure relate to handling this effect will based on executed and scheduled events in close temporal proximity to the trigger event. Accordingly, some aspects of the present disclosure relate to handling multiple input switching in the simulation of an arc during event propagation (e.g., at 260 of FIG. 2).

Figure 5B:
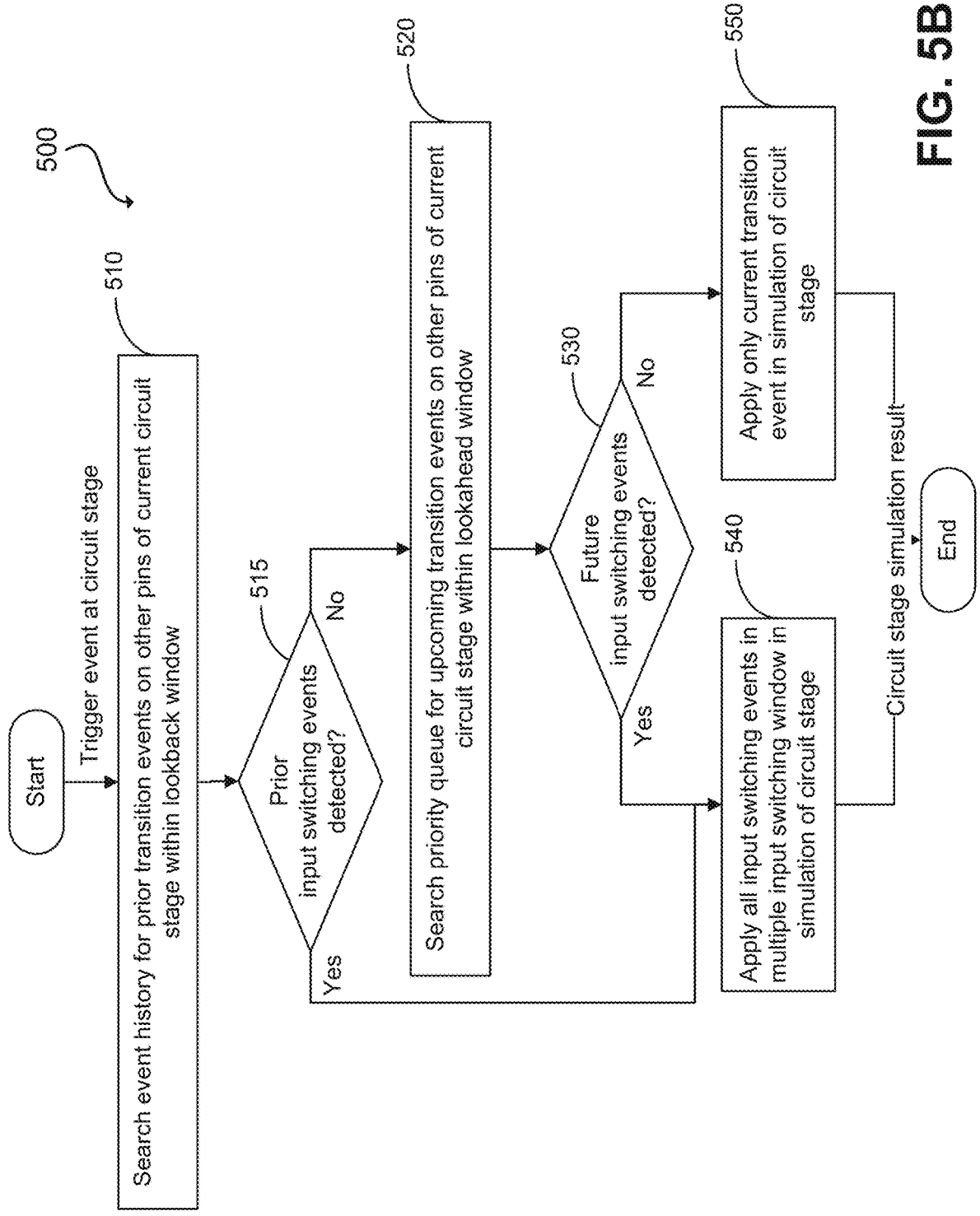
FIG. 5B is a flowchart of a method for simulating a circuit stage having multiple inputs according to one example of the present disclosure.

FIG. 5B is a flowchart of a method 500 for simulating a circuit stage having multiple inputs according to one example of the present disclosure. When simulating an arc (such as at 260 of the method 200 shown in FIG. 2), the processor simulates operation of a circuit stage in response to a current transition event at an input pin of the circuit stage. The transition event was dequeued from the priority queue and therefore represents the earliest timestamped event in the priority queue.

Figure 5C:
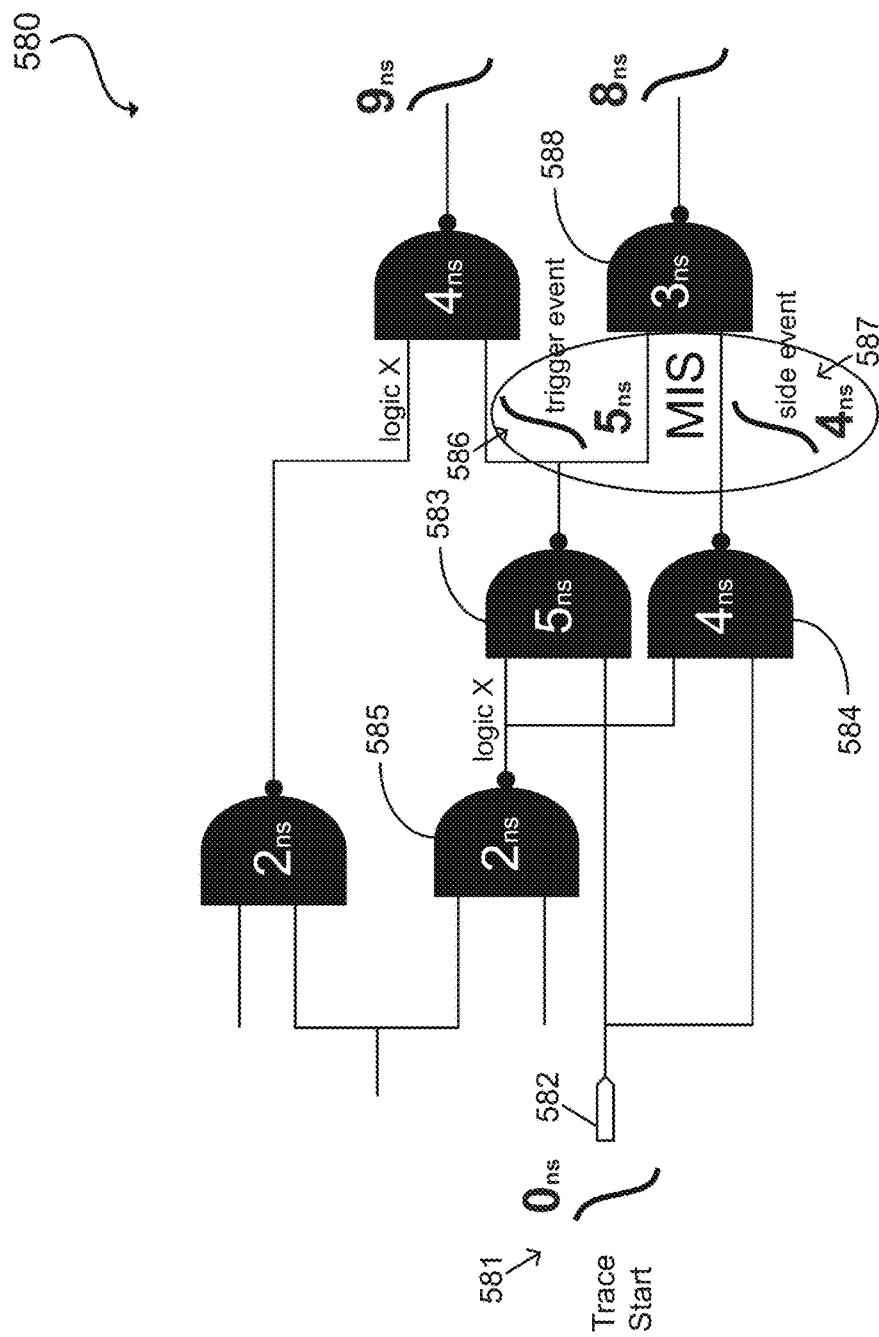
FIG. 5C illustrates a portion of a digital circuit design and the detection and simulation of multiple input switching according to one embodiment of the present disclosure.

FIG. 5C illustrates a portion of a digital circuit design and the detection and simulation of multiple input switching according to one embodiment of the present disclosure. The example circuit design 580 of FIG. 5C incudes six NAND gates and, in the example shown, only a single primordial event 581 is supplied at an input port 582 of the example circuit design 580. The input port 582 is connected to an input pin of a first NAND gate 583 and an input pin of a second NAND gate 584. The first NAND gate 583 and the second NAND gate 584 have second input pins that are connected to the output of a third NAND gate 585. However, because the third NAND gate 585 is outside of the fanout cone of the primordial event 581 and because this execution of the event-driven static timing analysis did not provide other primordial events or initial constant values that sensitized the inputs to the third NAND gate 585, the output of the third NAND gate 585 is unknown and therefore the corresponding net (as side inputs connected to the second input pins of the first NAND gate 583 and the second NAND gate 584) is set to logic X which signifies an unknown logic value.

In the example shown in FIG. 5C, the first NAND gate 583 introduces a delay of 5 ns and the second NAND gate 584 introduces a delay of 4 ns. Accordingly, first propagated event 586 output by the first NAND gate 583 and second propagated event 587 output by the second NAND gate 584 have timestamps of 5 ns and 4 ns, respectively. These events are applied to the first input pin and the second input pin of a fourth NAND gate 588 but have timestamps that are 1 nanosecond apart. These propagated events are added to the priority queue and dequeued and processed in order of timestamp, such that the second propagated event 587 is dequeued before the first propagated event 586 (4 ns versus 5 ns, respectively). In this example, the first propagated event 586 is labeled as the trigger event.

At 510, the processor searches the event history for prior input switching events (e.g., previously-executed events) on other input pins of the current circuit stage within the lookback window. At 515, the processor determines whether any such prior input switching events were detected in the search performed at 510. If any other prior input switching events were found in the history, then the processor continues to apply all detected input switching events found in the multiple input switching window at 540, as described in more detail below. If no prior input switching events were found in the lookback window, then the processor proceeds at 520.

If no prior input switching events were detected, at 520, the processor searches the priority queue for upcoming transition events on other input pins of the current stage within a lookahead window of time. As noted above, based on the invariant maintained by the priority queue that all events stored in the priority queue have a timestamp greater than or equal to the timestamp of the event at the head of the priority queue, all of the remaining events on the queue are scheduled to occur after the trigger event.

In more detail, at 520, the processor identifies, in the priority queue, unexecuted events on other input pins of the current circuit stage having timestamps within a lookahead window defined based on the midpoint time of the current transition event and a lookahead offset. FIG. 5A similarly depicts a lookahead time and a lookahead offset, where the lookahead time is computed based on a lookahead offset of time before the midpoint time of the trigger event.

In some examples of the present disclosure, the lookahead offset and the lookback offset are user-configurable values and, in some cases are set to a default calculated based on a 25% threshold offset from the 50% switching threshold of the trigger event. The mid-point or 50% switching threshold refers to the point at which the signal has completed 50% of its voltage transition (e.g., from a voltage representing logic 0 to a voltage representing logic 1 for a rising transition or from a voltage representing logic 1 to a voltage representing logic 0 for a falling transition). The threshold offsets are computed based on a percentage offset from the mid-point voltage. More concretely, supposing that logic 0 was represented by 0 V and logic 1 was represented by 4 V, the mid-point or 50% switching threshold is at 2 V. Assuming a 25% threshold offset from the 50% threshold, the lower of the voltages would be at 50%−25%=25% (e.g., 1 V) and the higher of the voltages would be at 50%+25%=75% (e.g., 3 V), therefore for a rising transition, the lookback offset and lookback time would be the time at which the transition rises to 1V, and the lookahead offset and lookahead time would be the time at which the transition rises to 3V. Because the rise time and fall time of a transition event may be different, the lookahead offset and the lookback offset may be different depending on whether the transition event is a rising transition from logic 0 to logic 1 or a falling transition from logic 1 to logic 0. In addition, the rise time and fall time of a transition event may differ at different inputs, such as based on the output slew of a gate driving the net and/or an input slew of the pin at which the event occurs, thereby resulting in different, and therefore the lookback offset and lookahead offset will depend on the characteristics of the transition (e.g., its duration based on slew).

At 530, the processor determines whether search for future events at 520 resulted in the detection of other input switching that occurred within a multiple input switching window (the lookahead window plus the lookback window) around the midpoint time of the trigger event. In a case where the processor determines that there are other events, then, at 540, the processor performs the simulation of the circuit stage by applying all of the detected transition events on the various corresponding input pins of the circuit stage (holding other input pins constant based on the recorded state of their nets). In a case where the processor determines that there are no other events, then it applies only the current transition event in the simulation of the circuit stage at 550. The results of the simulation of this circuit stage, whether computed based on multiple input switching events or a single transition event, is produced and returned (e.g., to proceed at 270 of the method 200 shown in FIG. 2).

While FIG. 5B shows one example embodiment where searching the event history for prior transition events has priority over searching for upcoming or future transition events, the present disclosure is not limited thereto. For example, in some embodiments, future events have priority over past events, such that the processor first looks for future switching events (e.g., in the priority queue) within the lookahead window and only looks for previous switching events in the event history within the lookbehind window if it did not find matches in the lookahead window. In still other embodiments, the processor always searches for events in both the lookahead window and in the lookback window and simulates all of the events found in both windows together with the trigger event, and in some embodiments, the processor selects the more impactful events, when considering the lookahead window and the lookback window. The impact of the side inputs detected in the windows may be determined based on, for example, determining which of the side inputs in the windows provides more extreme or critical behavior. As a more specific example, in the case of signals that are early, detecting which of the windows contains side input events that contribute to shorter delays (to be closer to the minimum delay path), and in the case of signals that are late, detecting which of the windows includes side input events would contribute to longer delays (to be closer to the maximum delay path).

In the example shown in FIG. 5C, assuming that the lookbehind offset is greater than 1 ns, the processor identifies the second propagated event 587 having timestamp 4 ns on the second input pin of the fourth NAND gate 588 as an event falling within the multiple input switching window (because the first propagated event 586 has a timestamp of 5 ns and therefore the lookback offset must be at least 1 ns for the lookback time to be earlier than the 4 ns timestamp of the second propagated event 587). Therefore, the first propagated event 586 and the second propagated event 587 are both applied when performing the simulation of the circuit stage that includes the fourth NAND gate 588.

The example shown in FIG. 5C with two inputs to a fourth NAND gate 588 has a symmetry in that the processing of the second propagated event 587 as a trigger event would capture the first propagated event 586 as a side event of a multiple input switching condition and that the subsequent processing of the first propagated event 586 as a trigger event would also capture the second fanout as its side event of another multiple input switching condition. While output events generated by the first propagated event 586 and second propagated event 587 (e.g., generated downstream of the fourth NAND gate 588) would be generated and scheduled, the output events that are scheduled later will be canceled because the output does not change. Nevertheless, this does not suggest that the first propagated event 586 should have been removed from the priority queue when it served as the side event to the execution of the second propagated event 587. For example, if the fourth NAND gate 588 had more than two inputs, then a third propagated event supplied at a third input pin of the fourth NAND gate 588 may have a timestamp that is outside the multiple input switching window of the second propagated event 587 (at 4 ns) but within the multiple input switching window of the first propagated event 586 (at 5 ns).

In some embodiments, the multiple inputs switching determination ensures reciprocity between the multiple events on different inputs. For example, if an event on input A overlaps with an event on input B, then the event on B should also overlap the event on input A. In some embodiments, this is implemented by applying the multiple input switching technique (e.g., as described above) a second time by switching the inputs (e.g., switching the event on input A with the event on input B). This can occur when the transition times of the two events are different, thereby causing the lookahead window and lookback window of one of the events to be larger than the lookahead and lookback window of the other event. For example, if the event at A completes its transition much more quickly than the event at B, then the lookahead or lookback window of the event at A will be relatively small, such that the event at B would be outside of this window associated with the event at A, thereby missing this multiple input switching scenario. Therefore, in some embodiments, the analysis is also performed as if the event at B were the trigger event, such that the window is computed based on its transition time. In such a case, the event at A may be captured within the lookback or lookahead window of the event at B, which allows the processor to determine that the event at B should be included in the multiple input switching (MIS) analysis of the trigger event at A.

Accordingly, aspects of the present disclosure are directed to incorporating side input events based on a multiple input switching window around the trigger event (or current event) into the simulation of a circuit stage, which provides a benefit of improved accuracy in the calculation of stage delay. In addition, event-based tracing approaches to multiple input switching allows switching events to occur in the same direction (e.g., all from logic 1 to logic 0 or all from logic 0 to logic 1) or in opposite directions (e.g., a mix of transitions from logic 1 to logic 0 and transitions from logic 0 to logic 1). In addition, aspects of the present disclosure relate to simulating the circuit stage based on only the events that are occurring within the multiple input switching window, as opposed to a forced application of all switching events that are expected to occur on the input pins of the circuit stage or taking the earliest or latest side inputs (as in DFS or BFS) will result in an overly pessimistic simulation that may result in false positives (e.g., reporting a potential problem that would not actually occur).

Another aspect of the present disclosure relates to static detection and suppression of glitches. Glitches occur at outputs of circuit stages due to, for example, closely spaced input events. Considering again the NAND gate shown in FIG. 5A, before the arrival of trigger event at input pin A and side event at input pin B, the inputs to the NAND gate are logic 0 and logic 1, respectively, such that the output of the NAND gate is logic 1.

If the side event (transitioning input pin B from logic 1 to logic 0) arrives long after the trigger event has fully transitioned input pin A to logic 1, then there will be a period before the arrival of the side event during which both inputs to the NAND gate are logic 1. In an ideal logic gate with no switching delays, the NAND gate would immediately output logic 0 when both of its inputs are logic 1, and then the NAND gate would immediately output logic 1 again when the side input completed the transition of input pin B to logic 0.

However, in a logic gate with switching delays, the response of the logic gate or cell depends on the slew rate of the logic gate or cell. For example, if the difference in arrival times of the trigger event and the side event is larger than the slew of the cell (e.g., the output rise time, output fall time, or average thereof), then the timing of the input events may cause a glitch, or temporary toggling in the output of a circuit cell such as a logic gate—assuming that the combination of input states during that period would cause a logical change in the output of the cell.

Accordingly, some aspects of the present disclosure relate to automatically detecting glitch events based on detecting two proximal transition events on a single net. In some embodiments, glitch detection takes place when a new event is scheduled. If a prior event in the opposite direction is detected on the same net (e.g., on the same input pin of the fanout stage) and the time spacing between the new event and the prior event (e.g., difference in the timestamps of the events) is less than the delay through the cell (e.g., inertial delay of the arc through the circuit), then the two events form a glitch, provided they were produced by different causal events. In some embodiments, whether a glitch is propagated, completely suppressed, or partially suppressed (e.g., scaled) depends on electrical characteristics of the circuit stage and may be modeled as a function of the inertial delay of the circuit stage (e.g., the arc or timing arc between input pins) and the difference between the timestamps of the events.

Figure 5D:
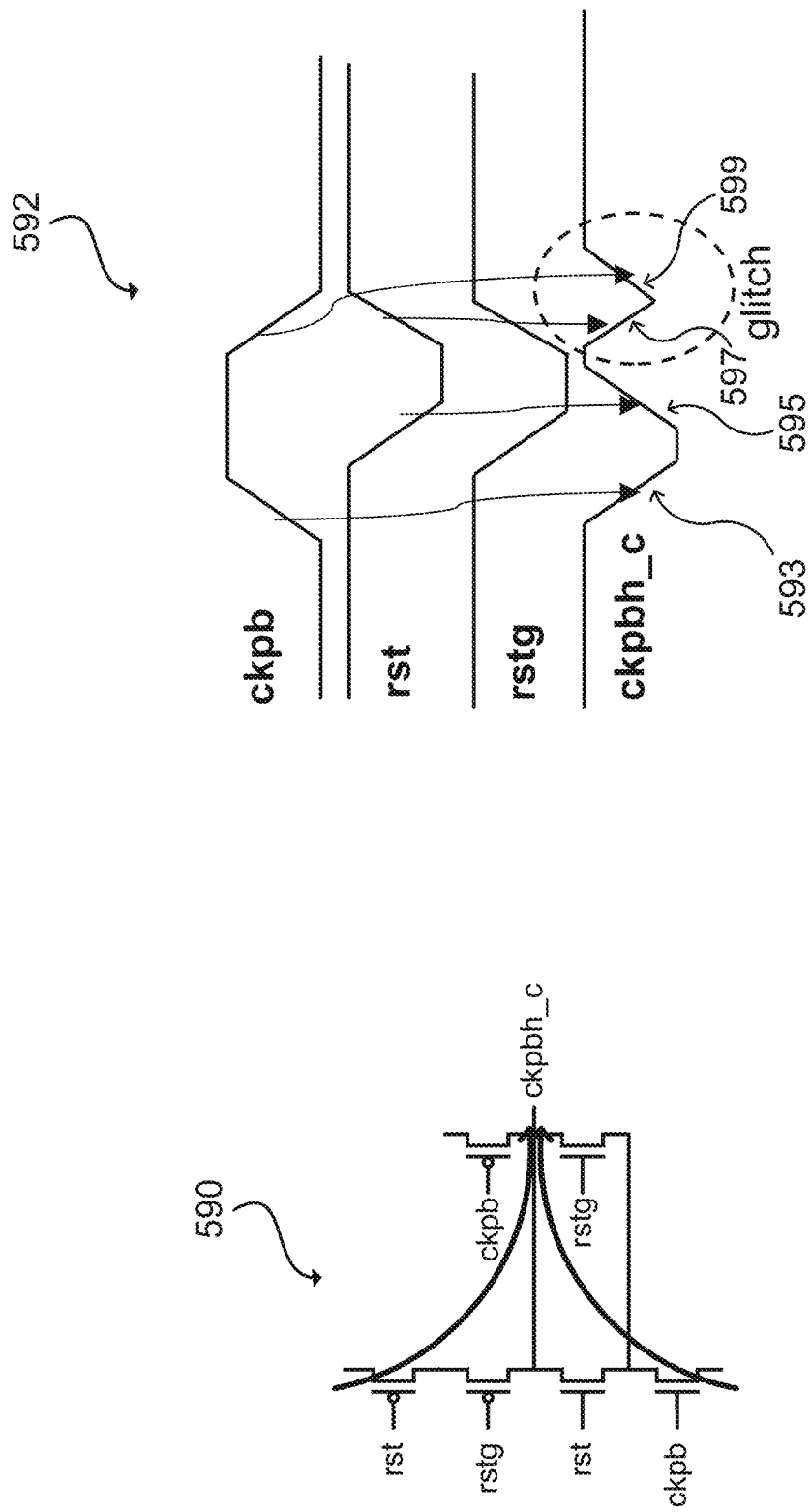
FIG. 5D depicts a portion of a digital circuit design and a signal timing diagram illustrating the detection of a glitch using event-based static timing analysis according to an embodiment of the present disclosure.

FIG. 5D depicts a portion of a digital circuit design and a signal timing diagram illustrating the detection of a glitch using event-based static timing analysis according to an embodiment of the present disclosure. In the example shown in FIG. 5D, the portion or cell of the digital circuit design 590 includes three input signals labeled: ckpb; rst; and rstg and one output signal labeled ckpbh_c. As shown in the timing diagram 592, a rising transition event at input ckpb of the cell 590 generates a first falling event 593 at the output ckpbh_c. Falling transition events at the rst and rstg inputs generate a corresponding first rising transition event 595 at the output pin ckpbh_c. A rising transition event at input rst then causes a second falling transition event 597 at the output pin ckpbh_c and a falling transition event at input ckpb causes a second rising transition event 599 at the output pin ckpbh_c. Here, the time difference between the first falling event 593 and the first rising event 595 is greater than the delay through the cell 590 and therefore these two events are not a glitch. However, the time difference between the second falling event 597 and the second rising event 599 is smaller than the delay through the cell 590 and therefore this pair of transitions is classified as a glitch. In some circuit designs, the upper limit of the width of a pulse that is considered a glitch is 10 picoseconds (ps).

In some examples of the present disclosure, the processor generates a report of all such pins or vertexes in which multiple transitions occur. In some further examples, the causality stack associated with each vertex or pin (as shown in the example of 3B) is presented alongside the pin that contains the glitches to show the causality path that led to the glitches. For example, the report may note that a glitch on net ckpbh_c caused by particular input events (e.g., the events on ckpb and rst indicated by the arrows) and may also include an identification of the causality path that led to the glitch.

As discussed above, some aspects of embodiments relate to detecting glitches that have a pulse width smaller than an inertial delay of a circuit stage. If so, then the pulse will not be propagated and the events corresponding to the glitch (e.g., events in opposite directions) can both be canceled, thereby reducing the number of events that are propagated through the system to perform the static timing analysis.

Some aspects of embodiments of the present disclosure relate to capturing multiple timing paths through volatile nets of the circuit, such as a net corresponding to an output of a multiplexer (mux). Volatile nets are connected to output pins of cells that have independent paths to them from inputs.

Figure 6A:
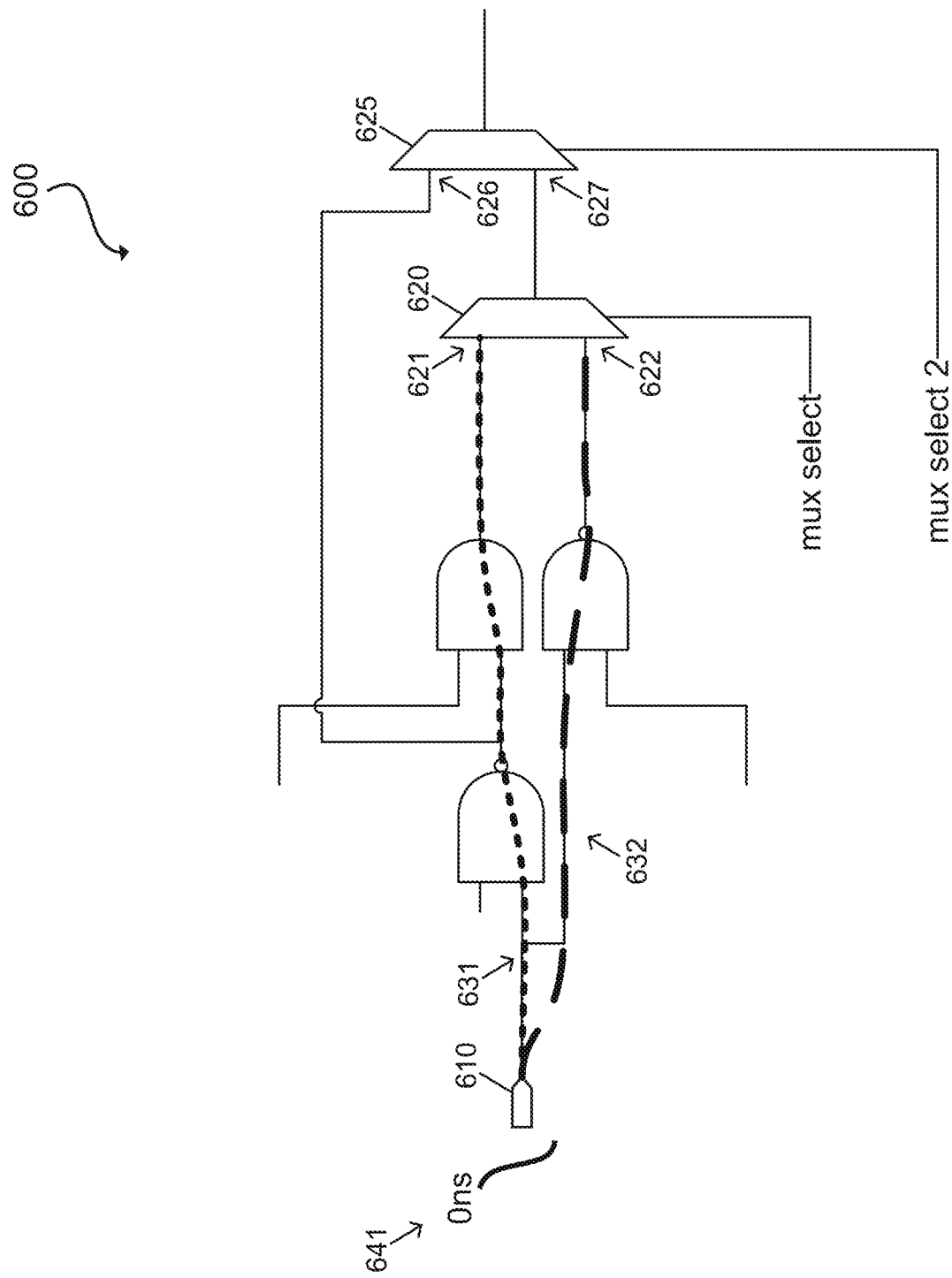
FIG. 6A is an example of a digital circuit including a volatile net in the form of an output of a multiplexer, where the digital circuit may be statically analyzed according to one embodiment of the present disclosure.

FIG. 6A is an example of a digital circuit design 600 including a volatile net in the form of a multiplexer, where the digital circuit may be statically analyzed according to one embodiment of the present disclosure. In the example shown in FIG. 6A, an input port 610 is connected to a multiplexer 620 through a first timing path 631 (shown with a dotted line) connected to a first input pin 621 of the multiplexer 620 and a second timing path 632 (shown with a dashed line) to a second input pin 622 of the multiplexer 620. The first timing path 631 and the second timing path 632 connect through different logic gates of the circuit design 600 and therefore experience different timing delays (e.g., based on switching delays of the circuit stages and propagation delays along the wires). The multiplexer 620 is shown as being controlled by a mux select signal.

A primordial event 641 is supplied at the input port and events are propagated, as discussed above, to reach the inputs of the multiplexer 620. The mux select in this example is outside of the fanout cone of the primordial event 641, and therefore may be set at a logic value of X. Therefore, it cannot be determined, based on the primordial event 641, which of the inputs will be selected by the multiplexer 620 and therefore which timing path will be propagated to the output of the circuit design 600. As such, both timing paths will be analyzed, as either of them could be a critical timing path (e.g., a maximum delay path or a minimum delay path) through the circuit design 600.

As such, aspects of embodiments of the present disclosure relate to processing events at volatile nets of a circuit design to trace the propagation of different events in accordance with different possible selections of signals through the volatile nets. Some signals arriving at volatile nets are stored as overflow events on an overflow queue or shadow queue for analysis after completing the analysis for another event that previously passed through the volatile net.

Figure 6B:
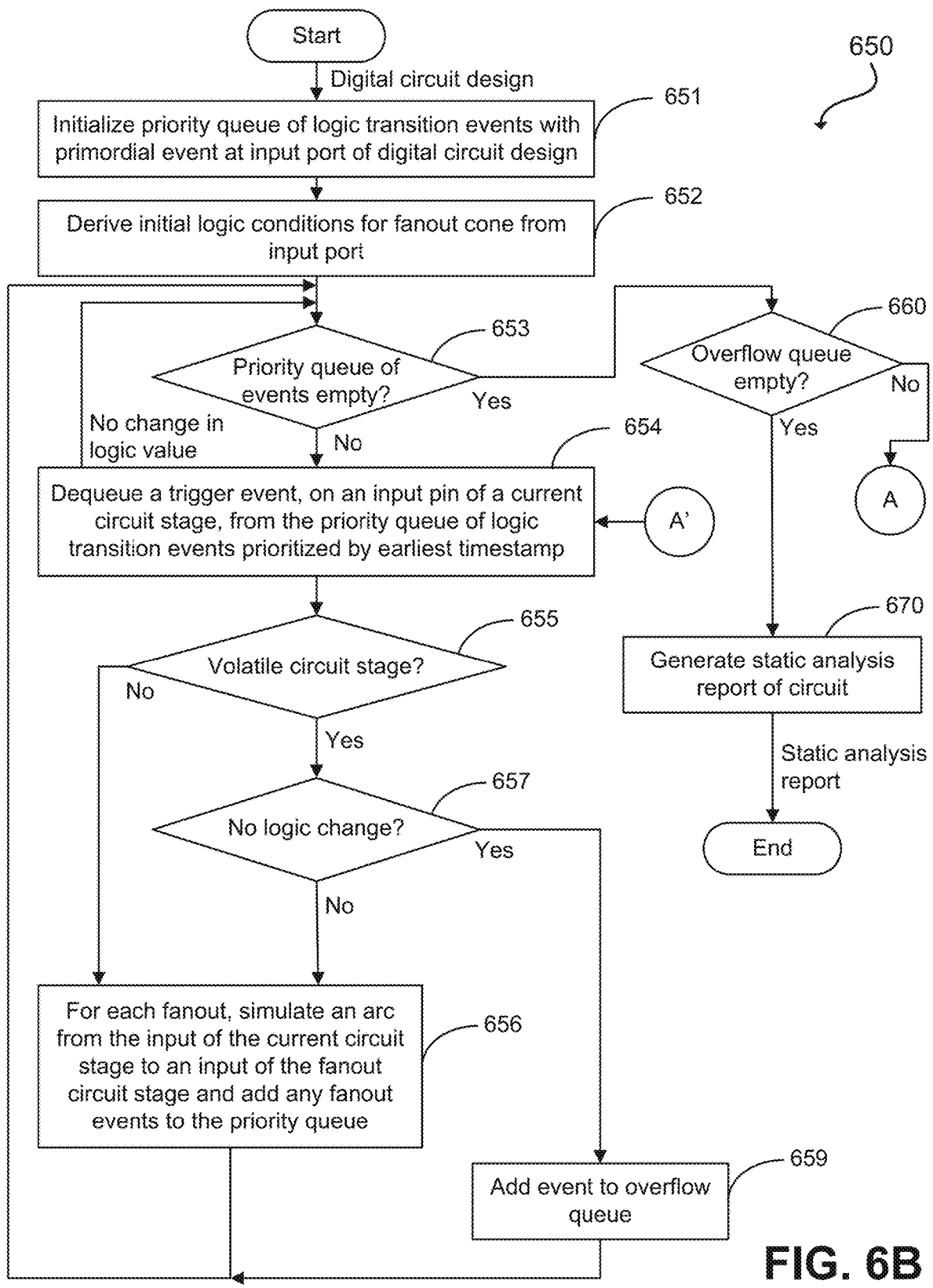
FIG. 6B is a flowchart of a method for processing a transition event at a volatile net of a circuit design in event-based static timing analysis according to one embodiment of the present disclosure.

FIG. 6B is a flowchart of a method 650 for processing a transition event at a volatile net of a circuit design in event-based static timing analysis according to one embodiment of the present disclosure. The method 650 shown in FIG. 6B is similar to the method 200 shown in FIG. 2, but where some of the details regarding, for example, the processing of fanouts from a circuit stage at 250, 260, and 270, are shown at a higher level to reduce repetition and to focus on the additional functionality not shown in FIG. 2. Nevertheless, it will be understood that details of operations described above with respect to the method 200 depicted in FIG. 2 are also applicable to embodiments described herein with respect to the method 650 depicted in FIG. 6.

At 651, the processor initializes a priority queue of logic transition events with a primordial event at an input port of the digital circuit design, and, at 652, the processor derives initial logic conditions for a fanout cone from the input port to be consistent with the primordial event, prior to its execution.

At 653, the processor determines whether the priority queue of events is empty. If not (e.g., there is at least one event on the priority queue), then the processor continues at 654 by dequeuing the event on the priority queue prioritized by earliest timestamp (with tiebreaking as necessary, as discussed above).

At 655, the processor determines whether the current circuit stage associated with the trigger event is a volatile circuit stage (e.g., whether the current circuit stage is a non-volatile circuit stage such as a combinational logic gate or a volatile circuit stage such as a multiplexer). In a case where the current circuit stage is not a volatile circuit stage, then the processor proceeds with simulating the propagation of the trigger event for each of the fanouts from the circuit stage at 656 (e.g., performing the operations at 250, 260, and 270 as described above with respect to method 200 illustrated in FIG. 2).

In a case where the current circuit stage is a volatile circuit stage, then the processor detects whether executing the event would result in a no-logic-change situation at the volatile net connected to the output pin of the volatile circuit stage (e.g., where the logic state of the volatile net does change) at 657.

Based on determining that the trigger event at the volatile circuit stage causes a logic change at 657, the processor simulates, at 656, the execution of the trigger event through the volatile circuit stage for each fanout of the volatile circuit stage.

On the other hand, if the processor detects, at 657, that executing the trigger event will result in a no-logic-change situation (where the logic state of the volatile net connected to the output pin of the volatile circuit stage will not change), then at 659, the processor adds the trigger event to an overflow event queue for later processing. Events propagated from volatile circuit stages may themselves be propagated to other volatile circuit stages that are downstream (in the fanout cone of the events passing through a volatile circuit stage). For example, the fanout circuit stage 625 is shown in FIG. 6A is shown as a two-input multiplexer having controlled by a second mux select signal (mux select 2) that is outside of the fanout cone of the primordial event 641. Therefore, the fanout circuit stage 625 is also a volatile circuit stage and would, likewise, process an event arriving at its first input pin 626 or its second input pin 627 as an overflow event by storing the overflow event on the overflow queue.

After simulating the trigger event at 656 or adding the trigger event to the overflow queue at 659, the processor then returns to 653 to process a next event from the priority queue.

As such, the processor proceeds with propagating events through the digital circuit design, processing only one of the events entering a volatile node, until the priority queue of events is empty. At this point, the processor has computed timing paths through the circuit based on the selected events through those volatile nodes.

At 660, the processor determines whether the overflow queue is empty. In a case where the overflow queue is not empty, then there is an overflow event to be processed, as shown in FIG. 6C (proceeding from label A in FIG. 6B).

Figure 6C:
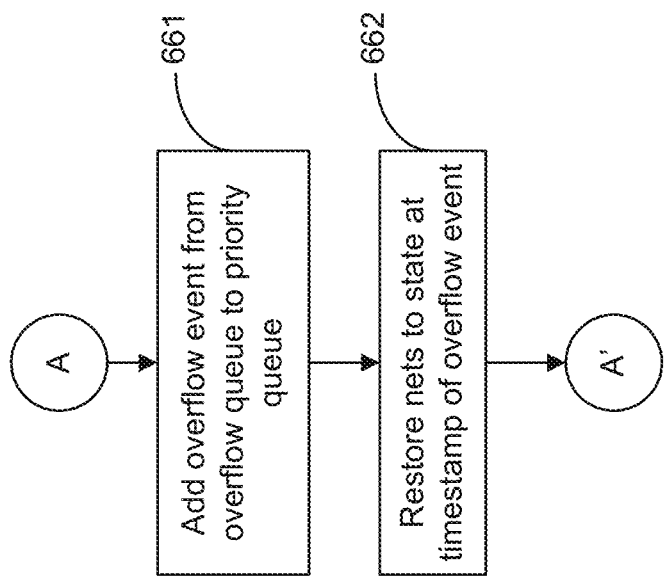
FIG. 6C is a flowchart of a method for processing an overflow event from the overflow queue according to one embodiment of the present disclosure.

FIG. 6C is a flowchart of a method for processing an overflow event from the overflow queue according to one embodiment of the present disclosure. An overflow event may be treated in a manner similar to a primordial event but are supplied to the inputs of the volatile nets at which they appeared before being added to the overflow queue. In more detail, at 661, the processor adds an overflow event from the overflow queue to the priority queue, then, at 662, resets the values of the nets to the states of those nets as of the timestamp of the overflow event (e.g., as determined from the history), thereby resetting the simulation time to the timestamp of the overflow event. The processor then proceeds to A' to dequeue the newly added overflow event from the priority queue at 654 and to proceed with the propagation of events starting from the removed overflow event.

Accordingly, the processor continues processing overflow events and adding overflow events to the overflow queue until all timing paths are analyzed, such that the overflow queue is detected to be empty at 660.

In a case where the overflow queue is empty, then there are no further events to be processed and the processor generates, at 670, a static analysis report of the digital circuit design based on the timestamps of the events appearing in the history of events, then output the report to the user (e.g., to be displayed on a display device, saved to storage, or transmitted over a computer network to an end-user device). In some embodiments, the static analysis report includes a path report that includes a plurality of critical timing paths. Each such critical timing path is a sequence of circuits (or circuit stages) through which a signal propagates from source to sink, showing the pins, nets, delays, and the like that form the critical timing path (e.g., the minimum delay path and the maximum delay path). In some embodiments, the static analysis report includes a report of clock arrival times at clock nets. In some embodiments, the static analysis report includes the history of every event executed by the system, where the history of events may be presented in temporal order (e.g., sorted by the timestamp of each event). Each event is associated with a unique event identifier (or event id) and identifies, for example, the direction of the transition (e.g., whether it is a rising transition or falling transition) and the input pin on which the event was executed. Each event may also indicate the result of executing the event, such as whether it was blocked (e.g., due to infeasible side inputs) or if it was propagated through the circuit stage or cell at which it was input. In a case where the event was propagated through the circuit stage, the static analysis report further includes the propagated events that were generated by this event at one or more outputs of the circuit stage or cell, where those propagated events are also identified by unique event identifiers. These propagated events may then appear elsewhere in the static analysis report, to present the results of executing those propagated events, or may be indicated as canceled (e.g., because they cause no logic change at the input ports on which they are applied). In some embodiments, the static analysis report is presented using a visualization tool, such as by providing visual highlighting between the events and the corresponding locations in the circuit design as well as corresponding edges or transitions in the signal waveform diagrams associated with various pins and/or nets (likewise, in some embodiments, selecting a transition in a signal waveform diagram presents the associated information regarding the corresponding transition event). In some embodiments, selecting a propagated event from a current event presents the information associated with that propagated event (e.g., by scrolling the static analysis report to the portion representing the propagated event or by showing a pop-up window, or by expanding a branch of a tree representation of the relationships between events and propagated events, where a primordial event may be the root of the tree).

Some aspects of embodiments of the present disclosure further relate to pruning events from the overflow queue. For example, when running the static analysis to determine critical paths of the circuit design (whether critical in terms of, for example, timing or power, as described in more detail below), the processor may determine that some overflow events are not part of a critical path, and therefore prune them from analysis. By pruning overflow events, those overflow events do not need to be propagated through the circuit design, thereby reducing the overall runtime for performing the event-driven static analysis of the circuit design. In more detail, when selecting the next overflow event to be executed (assuming that the regular priority queue is empty), the processor selects the most critical event on the same vertex, thereby pruning other events that are less critical. The most critical event will depend on the type of analysis being performed. For example, for determining the maximum path, the most critical event is the latest event. For determining the minimum path, the earliest event is the most critical event. For power consumption or noise, the most critical event may be the event that causes the highest or lowest power consumption or that causes the most or the least amount of noise.

As noted above, some aspects of embodiments of the present disclosure relate to multiple primordial events on the same port of the digital circuit design. This technique can be used to capture error conditions that can occur due to, for example, a rise-to-fall condition or a fall-to-rise condition. To test both conditions, it is sufficient to introduce three primordial events, either as: a falling transition event, a rising transition event, and a falling transition event (fall-rise-fall); or as a rising transition event, a falling transition event, and a rising transition event (rise-fall-rise).

Figure 7A:
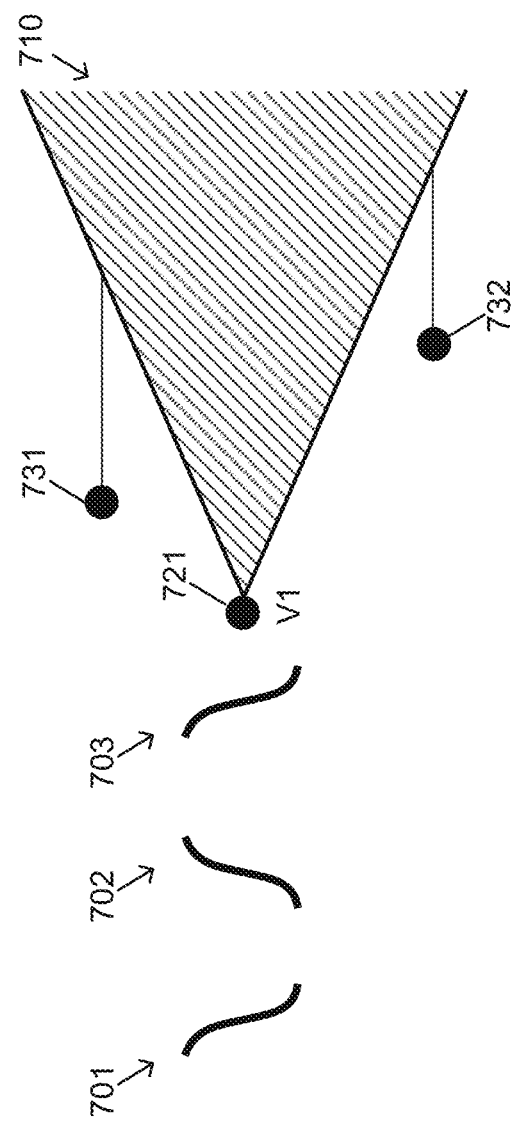
FIG. 7A illustrates a fanout cone of a representing sub-circuits within the circuit design that are downstream of multiple primordial events (e.g., a sequence of three primordial events) at an input port.

FIG. 7A illustrates a fanout cone representing sub-circuits within the circuit design that are downstream of multiple primordial events (e.g., a sequence of three primordial events) at an input port. FIG. 7A depicts the particular example of a fall-rise-fall sequence of primordial events including a fall transition event 701 (1→0), a rise transition event 702 (0→1), and another fall transition event 703 (1→0) that are supplied to an input port 721 (labeled V1) having a fanout cone 710. Accordingly, the fall transition event 701 and the rise transition event 702 cover the fall-to-rise condition and the rise transition event 702 together with the other fall transition event 703 together cover the rise-to-fall condition. As discussed above, there may be side inputs to the fanout cone 710 such as first side input 731 and second side input 732. The multiple primordial events have different timestamps such that they are executed on the input port 721 one at a time. Accordingly, all of these primordial events are initially added to the priority queue (e.g., based on their timestamps) and executed when they are dequeued from the priority queue in order to preserve the intended causality of events propagated through the fanout cone 710 of the digital circuit. When initializing the fanout cone from the input port (e.g., at 220 of FIG. 2), the initial logic condition at each of the nets in the fanout cone is set based on the earliest primordial event (e.g., the primordial event having earliest timestamp), which may be referred to herein as the earliest primordial event on the input port or the earliest primordial event of the fanout cone.

Figure 7C:
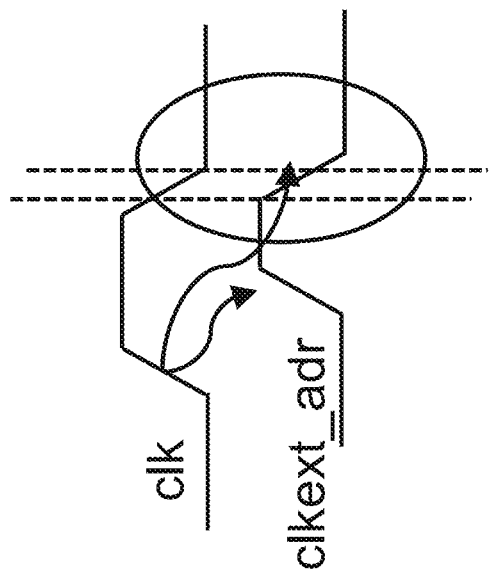
FIG. 7C is a signal timing diagram of input signals to the circuit shown in FIG. 7B to illustrate performing static analysis using multiple primordial events on an input port according to one embodiment of the present disclosure.
Figure 7B:
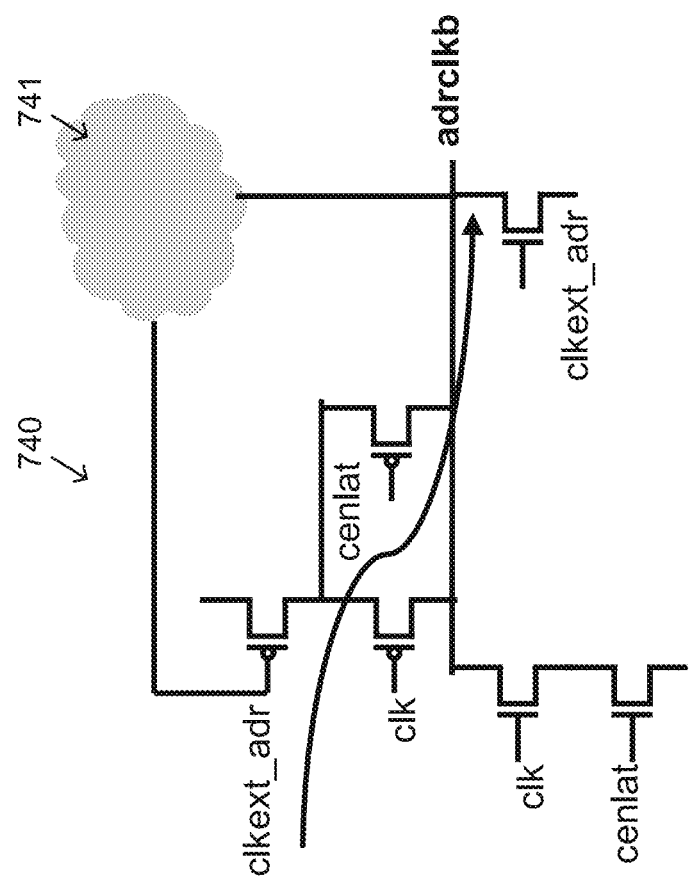
FIG. 7B depicts an example of a portion of a circuit or a cell that can exhibit undesired behavior in response to a sequence of transition events.

FIG. 7B depicts an example of a portion of a circuit or a cell 740 that can exhibit undesired behavior in response to a sequence of transition events, and FIG. 7C is a signal timing diagram of input signals to the circuit shown in FIG. 7B to illustrate performing static analysis using multiple primordial events on an input port according to one embodiment of the present disclosure. In more detail, it is assumed that the cell 740 is supplied with a rising primordial event, followed by a falling primordial event. The cell 740 takes an input clock signal (clk) and receives a feedback signal (clkext_adr) that was generated off the rising primordial event and that was driven through another circuit 741. This feedback signal (clkext_addr) interacts with the falling primordial event, as shown in FIG. 7C, because the output of the gate can pull up through the PMOS transistor stack when clk is low and clkext_adr is also low. These types of interactions between propagated events off multiple primordial events cannot be handled unless they are included in the same trace. Accordingly, supplying multiple primordial events enables the detection of such circumstances, whereas a single primordial event would not detect such a circumstance (because there would be no further events on the input clock signal after the single primordial event).

Figure 8:
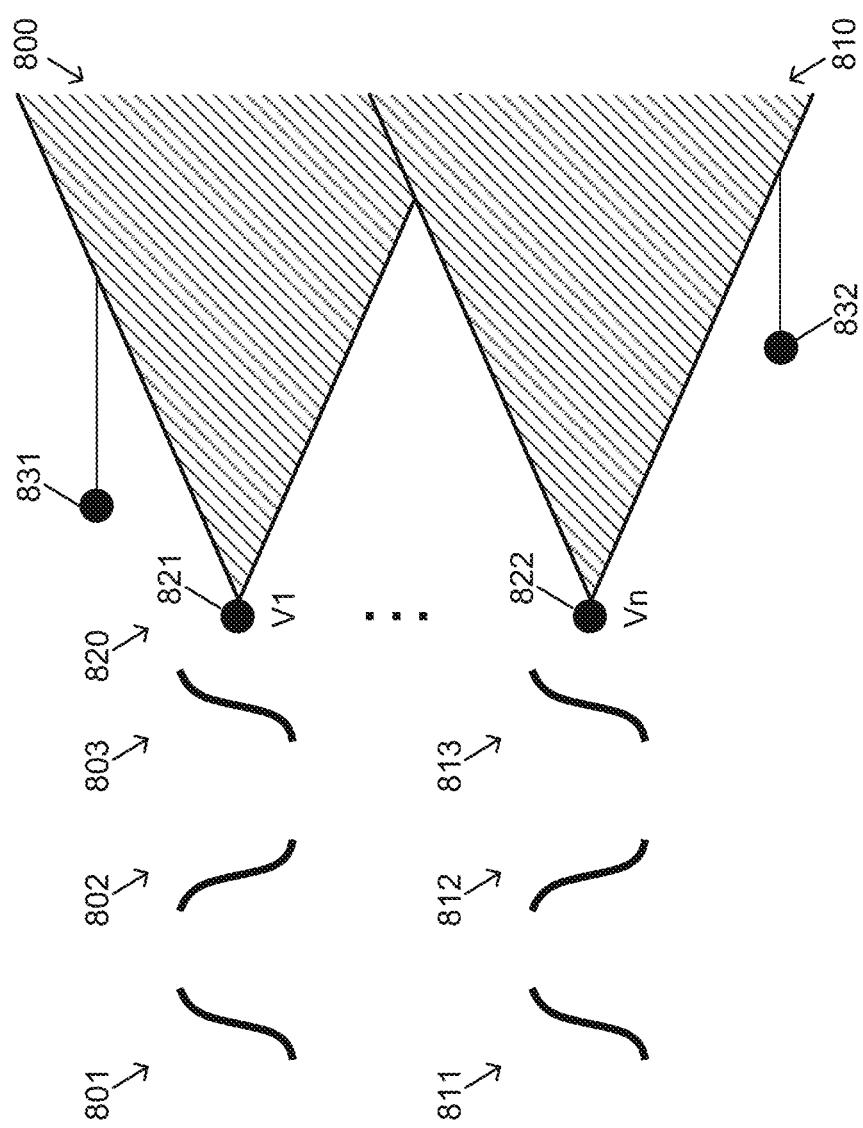
FIG. 8 depicts a digital circuit design having multiple input ports with overlapping fanout cones and supplying primordial events to the multiple input ports according to one embodiment of the present disclosure.

FIG. 8 depicts a digital circuit design having multiple input ports 820 with overlapping fanout cones (e.g., fanout cones 800 and 810) and supplying primordial events to the multiple input ports according to one embodiment of the present disclosure. In some embodiments, the multiple different input ports 820 are input ports for different clock signals (e.g., for tracing all clock signals in the circuit design). In some embodiments, the multiple different input ports 820 are different input ports for logic signals (e.g., data). In some embodiments, the multiple different input ports 820 include one or more input ports for clock signals and one or more input ports for logic signals. As shown in FIG. 8, a first input port 821 receives one or more primordial events (e.g., three primordial events 801, 802, and 803) and a second input port 822 receives one or more primordial events (e.g., three primordial events 811, 812, and 813). The fanout cones for the multiple input ports 820 overlap, such that events propagated from one of the input ports (e.g., the first input port 821) are transmitted to cells that are also downstream of another input port (e.g., the second input port 822). As above, side inputs may also provide input from exogenous events that are outside of the fanout cones 800 and 810 of the primordial events. In the case where different ones of the input ports are clock input ports, this may result in the merging of clocks to create new clocks. When initializing the fanout cone from the multiple different input port 820 (e.g., at 220 of FIG. 2), the initial logic condition at each of the nets in each of the fanout cones is set based on the earliest primordial event (e.g., the primordial event having earliest timestamp or the initial primordial event of each fanout cone) at the input port corresponding to that fanout cone. A given net may lie in an overlapping region of the fanout cones from multiple different input ports. In such a case, the earliest primordial events at each of the multiple different input ports may result in a same value (a consistent value) or different values (e.g., conflicting values) being derived for the initial logic state of that net in the overlapping region. In a case where the net in the overlapping region is derived to be a consistent value based on all the earliest primordial events of the fanout cones that overlap in the overlapping region, then the initial logic condition at that net is set to that consistent value. However, in a case where the net in the overlapping region of two fanout cones is derived to have two different possible values based on the earliest primordial events of those two fanout cones, then the initial logic condition of that net is set to a logic value representing an unknown state (e.g., the X logic state in a logic value system that may include, for example, a logic 0 state, a logic 1 state, and a logic X state).

While FIG. 8 shows an example with primordial events at two different input ports, the present disclosure is not limited thereto and primordial events may be supplied to more than two different input ports (e.g., n different input ports, as indicated by the ellipses between the first input port V1 821 and the second input port Vn 822). The fanout cones from these two or more input ports may overlap in accordance with the connections between the cells of the circuit design that are downstream of those input ports.

In some cases, primordial events are supplied to all inputs of the digital circuit design. This increases the flexibility in design partitioning because it enables tracing from multiple inputs exposed by a design cut when partitioning, thereby making it easier to perform accurate static analysis on portions of an overall circuit design. This also improves ease of use for circuit designers because circuit designers would otherwise need to include more of the design upstream of the portion of the circuit of interest so as to facilitate one common input to trace from (which is not always possible). Tracing from data ports also provides improved accuracy, especially when the static analysis is performed with the multiple inputs switching techniques described above.

Accordingly, some aspects of embodiments of the present disclosure relate to finding critical paths, which, in turn, are used to determine timing windows (or minimum and maximum timing envelope) of nets in the circuit design. This timing window is important for signal integrity analysis (crosstalk delay and noise calculations) and power analysis.

Some aspects of embodiments of the present disclosure relate to power analysis. A given circuit stage may consume some amount of power in response to the propagation of a signal to an input pin of the circuit stage. The amount of power consumed may vary depending on intrinsic factors, such as the dimensions of the transistors, the voltages applied, and the like, as well as extrinsic factors, such as whether the input transition is from logic 0 to logic 1 or from logic 1 to logic 0, and the states of the nets at other input pins to the circuit stage, and whether the event causes a change in the output of the circuit stage. Accordingly, in some embodiments, the processor further calculates the power consumption of a circuit stage in response to a trigger event when simulating the execution of the trigger event through the circuit stage. By summing the power consumption at each circuit stage of a timing path, the processor computes the power consumption of paths through the circuit (e.g., based on the switching activity), and can thereby determine, for example, critical power paths corresponding to maximum power consumption and minimum power consumption, and/or compute exhaustive power consumption values for each path through the circuit.

As discussed above, after performing an event-driven static timing analysis of a circuit design, the processor generates a report of the analysis results and presents the report to a user, such as by displaying the report on a display device, transmitting the report over a network, or storing the report in persistent storage (e.g., a solid state drive or in network-accessible cloud storage). For example, embodiments of the present disclosure enable the timing model to be extracted to generate a library file (e.g., a .lib file) that contains timing, noise, and power abstractions of the circuit for feeding into a hierarchical analysis flow.

Some aspects of embodiments of the present disclosure relate to generating an event tree and initial logic conditions. An event tree according to some embodiments is a representation of events and their causal linkages, tracing back to the primordial event. This event tree may be represented in text or as a graphical representation, e.g., stored as a collection of linked nodes in a graph data structure.

In some examples of the present disclosure, the event tree is tracked by associating each event with a unique event identifier (or event id). When performing propagation of events and generating fanout events based on corresponding trigger events, the processor stores the fanout event ids in association with their corresponding trigger event or parent event (or multiple trigger events or parent events in the case of multiple inputs switching).

In addition, in some embodiments, events that are blocked, pruned, canceled, and the like are shown in the event tree along with their parent events on a traced path back to the primordial event. This allows the user to view the causal path that led to events being blocked, pruned, or canceled when analyzing the behavior of the circuit design.

Accordingly, various aspects of embodiments of the present disclosure relate to event-driven static timing analysis of digital circuit designs to trace timing paths through the circuit. The event-driven approach provides more accurate results than other techniques for static timing analysis based on a depth-first search and provides exhaustive analysis of all timing paths, rather than merely sampling the behavior of the circuit based on a small selection of possible input vectors to the circuit. Various aspects of embodiments of the present disclosure also relate to performing power analysis using the event-driven static analysis of the digital circuit design. Using an event-driven approach according to the present disclosure is also, on average, about 4.75 times faster than a comparable approach based on dynamic clock simulation (DCS), when tested on ten real-world circuit designs of varying sizes.

Figure 9:
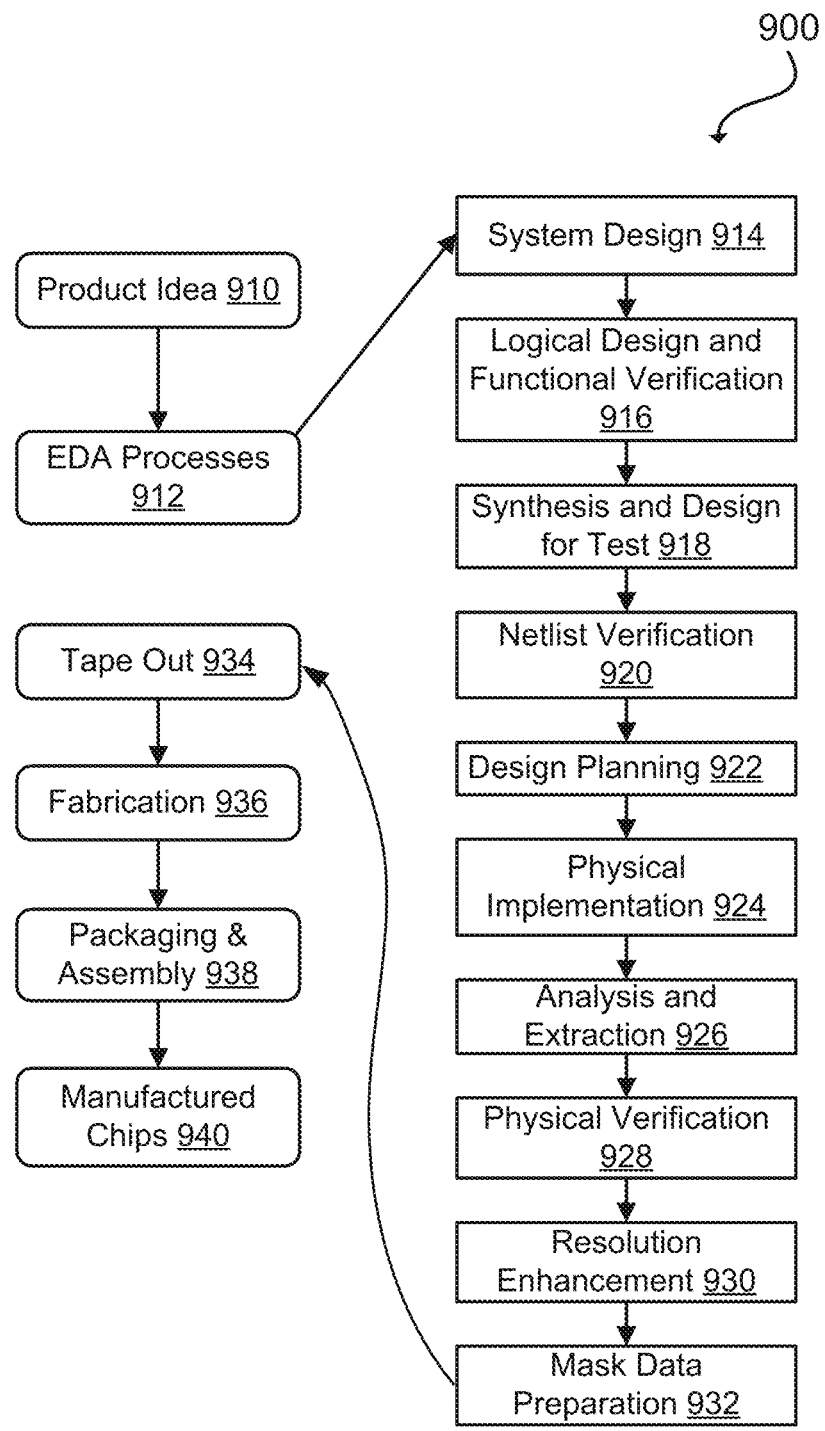
FIG. 9 depicts a flowchart of various processes used during the design and manufacture of an integrated circuit in accordance with some embodiments of the present disclosure.

FIG. 9 illustrates an example set of processes 900 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 910 with information supplied by a designer, information which is transformed to create an article of manufacture that uses a set of EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly processes 938 are performed to produce the finished integrated circuit 940.

Specifications for a circuit or electronic structure may range from low-level transistor material layouts to high-level description languages. A high-level of representation may be used to design circuits and systems, using a hardware description language ('HDL') such as VHDL, Verilog, System Verilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 9. The processes described by FIG. 9 may be enabled by EDA products (or EDA systems).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints, which may include applying an event-driven static timing analysis according to embodiments of the present disclosure, and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system (such as computer system 1000 of FIG. 10) may be used to store the programs and data structures that are used by some or all of the EDA products described herein, and products used for development of cells for the library and for physical and logical design that use the library.

Figure 10:
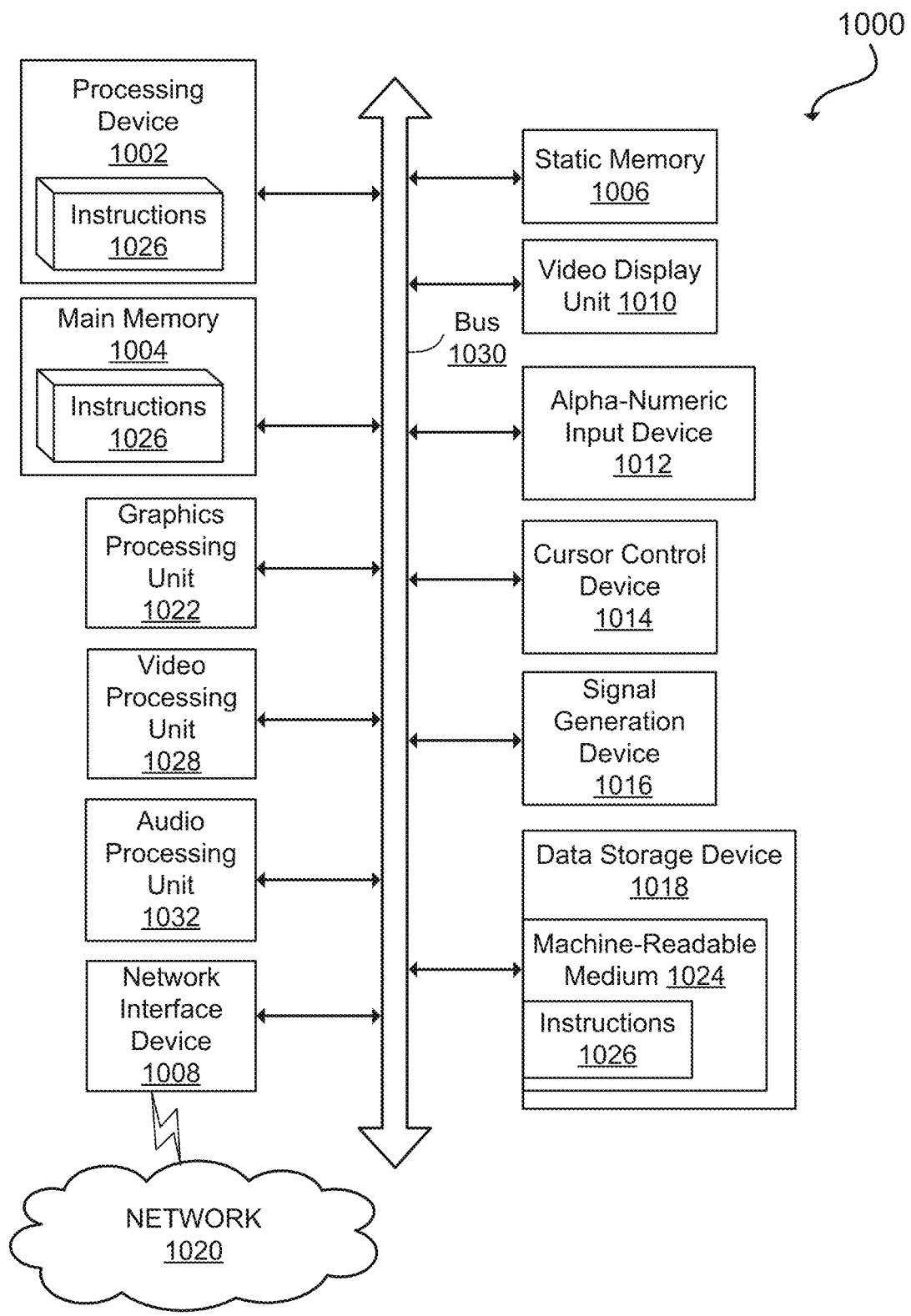
FIG. 10 depicts a diagram of an example computer system in which embodiments of the present disclosure may operate.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random-access memory (DRAM) such as synchronous DRAM (SDRAM), a static memory 1006 (e.g., flash memory, static random-access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   receiving a digital circuit design comprising a plurality of circuit stages;
   deriving, by a processing device, initial logic conditions for a plurality of nets in a fanout cone from an input port of the digital circuit design in accordance with a primordial event at the input port;
   initializing a priority queue of logic transition events prioritized by corresponding timestamps with the primordial event;

determining a trigger event from the priority queue, where the trigger event has a trigger event timestamp equal to or earlier than the timestamps of all other logic transition events in the priority queue, the trigger event representing a logic transition at an input pin of a current circuit stage of the plurality of circuit stages;

simulating a first arc of the digital circuit design from the input pin of the current circuit stage to an input pin of a fanout circuit stage of the digital circuit design connected to an output of the current circuit stage to generate a propagated event representing a logic transition at the input pin of the fanout circuit stage;

computing a propagated event timestamp of the propagated event based on:
  the trigger event timestamp; and
  a delay associated with the first arc connecting the current circuit stage to the fanout circuit stage;

enqueuing, by a processing device, the propagated event on the priority queue in accordance with the propagated event timestamp; and generating a static analysis report of the digital circuit design based on the propagated event timestamp.

2. The method of claim 1, further comprising:
determining a second trigger event from the priority queue, the second trigger event having a second trigger event timestamp equal to or earlier than all other logic transition events in the priority queue, the second trigger event being associated with a second current circuit stage of the plurality of circuit stages;

simulating a second arc of the digital circuit design from an input pin of the second current circuit stage to an input pin of a second fanout circuit stage of the digital circuit design connected to an output of the second current circuit stage to generate a second propagated event representing a logic transition at the input pin of the second fanout circuit stage;

computing a second propagated event timestamp of the second propagated event based on:
  the second trigger event timestamp; and
  a delay associated with the second arc connecting the second current circuit stage to the second fanout circuit stage; and enqueuing the second propagated event on the priority queue in accordance with the second propagated event timestamp, wherein the first arc and the second arc are on different timing paths through the digital circuit design.

3. The method of claim 1, further comprising:
determining a second trigger event from the priority queue, the second trigger event having a second trigger event timestamp equal to or earlier than all other logic transition events in the priority queue, the second trigger event being associated with a second current circuit stage of the plurality of circuit stages; and blocking the second trigger event based on determining an infeasible sensitization based on a logic condition of a side input of the second current circuit stage.

4. The method of claim 1, further comprising:
determining a second trigger event from the priority queue, the second trigger event having a second trigger event timestamp equal to or earlier than all other logic transition events in the priority queue, the second trigger event being associated with a second current circuit stage of the plurality of circuit stages;

simulating a second arc of the digital circuit design from an input pin of the second current circuit stage to an input pin of a second fanout circuit stage of the digital circuit design connected to an output of the second current circuit stage to generate a second propagated event representing a logic transition at the input pin of the second fanout circuit stage;

determining that the second propagated event causes no change in a logic condition at the input pin of the second fanout circuit stage; and cancelling the second propagated event.

5. The method of claim 1, wherein the simulating the first arc of the digital circuit design comprises:
searching, in a multiple input switching window around the trigger event timestamp, for other events on one or more other input pins of the current circuit stage; and in response to detecting one or more other events, applying all events in the multiple input switching window when simulating the first arc.

6. The method of claim 1, further comprising:
identifying a second propagated event representing a different logic transition than the logic transition of the propagated event on the input pin of the fanout circuit stage, the second propagated event having a second propagated event timestamp earlier than the propagated event timestamp; and detecting a glitch based on a function of:
  a difference in the propagated event timestamp and the second propagated event timestamp; and
  an inertial delay of the first arc.

7. The method of claim 1, further comprising:
determining that the current circuit stage associated with the trigger event is a volatile circuit stage; and adding the trigger event to an overflow queue as an overflow event for processing after emptying the priority queue.

8. The method of claim 1, further comprising: enqueueing one or more additional primordial events at the input port of the digital circuit design onto the priority queue, the one or more additional primordial events having timestamps later than the primordial event.

9. The method of claim 1, further comprising:
deriving additional initial logic conditions for a plurality of nets in one or more additional fanout cones from one or more additional input ports of the digital circuit design in accordance with an earliest primordial event of one or more primordial events at each of the one or more additional input ports; and enqueuing the one or more primordial events at each of the one or more additional input ports onto the priority queue.

10. A system comprising:
a memory storing instructions; and
a processor, coupled with the memory and to execute the instructions, the instructions when executed cause the processor to:
  receive a digital circuit design comprising a plurality of circuit stages of the plurality of circuit stages;
  derive initial logic conditions for a plurality of nets in a fanout cone at an input port of the digital circuit design in accordance with a primordial event at the input port;
  initialize a priority queue of logic transition events prioritized by corresponding timestamps with the primordial event;
  determine a trigger event from the priority queue, where the trigger event has a trigger event timestamp equal to or earlier than the timestamps of all other logic transition events in the priority queue, the trigger event representing a logic transition at an input pin of a current circuit stage;

the trigger event having a highest priority value among one or more priority values of one or more events in the priority queue, the one or more priority values being computed based on corresponding timestamps of the one or more events in the priority queue;

simulate a first arc of the digital circuit design from the input pin of the current circuit stage to an input pin of a fanout circuit stage connected to an output of the current circuit stage to generate a propagated event representing a logic transition at the input pin of the fanout circuit stage;

compute a propagated event timestamp of the propagated event based on:
  the trigger event timestamp; and
  a delay associated with the first arc connecting the current circuit stage to the fanout circuit stage;

enqueue the propagated event on the priority queue in accordance with the propagated event timestamp; and generate a static analysis report based on the propagated event timestamp, the static analysis report comprising a critical timing path of the digital circuit design comprising the current circuit stage and the fanout circuit stage.

11. The system of claim 10, wherein the memory further stores instructions that, when executed cause the processor to:
  determine a second trigger event from the priority queue, the second trigger event having a second trigger event timestamp equal to or earlier than all other logic transition events in the priority queue, the second trigger event being associated with a second current circuit stage of the plurality of circuit stages; and
  block the second trigger event based on determining an infeasible sensitization based on a logic condition of a side input of the second current circuit stage.

12. The system of claim 10, wherein the memory further stores instructions that, when executed cause the processor to:
  determine a second trigger event from the priority queue, the second trigger event having a second trigger event timestamp equal to or earlier than all other logic transition events in the priority queue, the second trigger event being associated with a second current circuit stage of the plurality of circuit stages;
  simulate a second arc of the digital circuit design from an input pin of the second current circuit stage to an input pin of a second fanout circuit stage of the digital circuit design connected to an output of the second current circuit stage to generate a second propagated event representing a logic transition at the input pin of the second fanout circuit stage; and
  cancel the second propagated event based on determining that the second propagated event causes no change in a logic condition at the input pin of the second fanout circuit stage.

13. The system of claim 10, wherein the memory further stores instructions that, when executed cause the processor to simulate the first arc of the digital circuit design by:
  searching, in a multiple input switching window around the trigger event timestamp, for other events on one or more other input pins of the current circuit stage; and
  in response to detecting one or more other events, applying all events in the multiple input switching window in the simulation of the first arc.

14. The system of claim 10, wherein the memory further stores instructions that, when executed cause the processor to:
  identify a second propagated event representing a different logic transition than the logic transition of the propagated event on the input pin of the fanout circuit stage, and the second propagated event having a second propagated event timestamp earlier than the propagated event timestamp; and
  detect a glitch based on a function of:
    a difference in the propagated event timestamp and the second propagated event timestamp; and
    an inertial delay of the first arc.

15. The system of claim 10, wherein the memory further stores instructions that, when executed cause the processor to:
  determine that the current circuit stage associated with the trigger event is a volatile circuit stage; and
  add the trigger event to an overflow queue as an overflow event for processing after emptying the priority queue.

16. The system of claim 10, wherein the static analysis report comprises an event tree comprising a parent node corresponding to the trigger event and a child node associated with the parent node corresponding to the propagated event.

17. A non-transitory computer readable medium comprising stored instructions, which when executed by a processor, cause the processor to:
  receive a digital circuit design comprising a plurality of circuit stages of the plurality of circuit stages;
  derive initial logic conditions for a plurality of nets in a fanout cone at an input port of the digital circuit design in accordance with a primordial event at the input port;
  initialize a priority queue of logic transition events prioritized by corresponding timestamps with the primordial event;
  determine a trigger event from the priority queue, where the trigger event has a trigger event timestamp equal to or earlier than the timestamps of all other logic transition events in the priority queue, the trigger event representing a logic transition at an input pin of a current circuit stage;
  the trigger event having a highest priority value among one or more priority values of one or more events in the priority queue, the one or more priority values being computed based on the corresponding timestamps of the one or more events in the priority queue;
  simulate a first arc of the digital circuit design from the input pin of the current circuit stage to an input pin of a fanout circuit stage connected to an output of the current circuit stage to generate a propagated event representing a logic transition at the input pin of the fanout circuit stage;
  compute a propagated event timestamp of the propagated event based on:
    the trigger event timestamp; and
    a delay associated with the first arc connecting the current circuit stage to the fanout circuit stage;
  enqueue the propagated event on the priority queue in accordance with the propagated event timestamp; and
  generate a static analysis report based on the propagated event timestamp, the static analysis report comprising a critical path of the digital circuit design comprising the current circuit stage and the fanout circuit stage.

18. The non-transitory computer readable medium of claim 17, wherein the critical path of the digital circuit design comprises a critical power path of the digital circuit design representing a path having highest power consumption.

19. The non-transitory computer readable medium of claim 18, further storing instructions that, when executed cause the processor to simulate the first arc of the digital circuit design by:
- searching, in a multiple input switching window around the trigger event timestamp, for other events on one or more other input pins of the current circuit stage; and
- in response to detecting one or more other events, applying all events in the multiple input switching window in the simulation of the first arc,
- wherein the path having highest power consumption comprises the current circuit stage, and
- wherein a power consumption of the current circuit stage is computed based on the events in the multiple input switching window.

20. The non-transitory computer readable medium of claim 17, further storing instructions that, when executed cause the processor to:
- detect glitching behavior in the digital circuit design by detecting two events on a same output pin in the digital circuit design; and
- suppress the glitching behavior by canceling the two events on the same output pin in the digital circuit design.

* * * * *